(12) United States Patent
Kudekar et al.

(10) Patent No.: US 11,005,635 B2
(45) Date of Patent: May 11, 2021

(54) RELIABLE CHANNEL ASSISTED HYBRID-ARQ

(71) Applicant: QUALCOMM Incorporated, San Diego, CA (US)

(72) Inventors: Shrinivas Kudekar, Bridgewater, NJ (US); Thomas Joseph Richardson, South Orange, NJ (US); Xinzhou Wu, Hillsborough, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 14/861,604

(22) Filed: Sep. 22, 2015

(65) Prior Publication Data
US 2017/0085354 A1 Mar. 23, 2017

(51) Int. Cl.
*H04L 5/00* (2006.01)
*H04L 1/18* (2006.01)
*H04L 1/00* (2006.01)

(52) U.S. Cl.
CPC .......... *H04L 5/0057* (2013.01); *H04L 1/1812* (2013.01); *H04L 1/1819* (2013.01);
(Continued)

(58) Field of Classification Search
None
See application file for complete search history.

(56) References Cited

U.S. PATENT DOCUMENTS 6,977,888 B1 12/2005 Frenger et al.
7,889,708 B2 * 2/2011 Ihm .................... H04L 1/0656
370/343
(Continued)

FOREIGN PATENT DOCUMENTS

CN 1449206 A 10/2003
CN 1496051 A 5/2004
(Continued)

OTHER PUBLICATIONS

3GPP, 3rd Generation Partnership Project; Technical Specification Group Radio Access Network; Study on Licensed-Assisted Access to Unlicensed Spectrum, Release 13, 3GPP Technical Report, Jun. 2015, 87 pgs, 3GPP TR 36.889, No. V13.0.0, 3rd Generation Partnership Project, Sophia-Antipolis Cedex, France.
(Continued)

*Primary Examiner* — Saba Tsegaye
(74) *Attorney, Agent, or Firm* — Holland & Hart LLP

(57) ABSTRACT

Methods, systems, and devices are described for wireless communication. A transmitter may receive feedback that a station failed to decode a packet sent over a first channel, and the transmitter may determine to re-send the packet or to send parity bits over the first channel or over a second channel to assist in decoding the failed packet. The first channel may be in an unlicensed radio frequency spectrum, and the second channel may be in a licensed radio frequency spectrum and may have a higher reliability level compared to the first channel. The transmitter may determine a first channel degradation level, which may be based on a signal-to-noise ratio received from the station, and may determine an amount of parity bits to send based on the degradation. The transmitter may determine the reliability level of each channel, which may be based on a channel quality indicator.

26 Claims, 16 Drawing Sheets

(52) U.S. Cl.
CPC .......... *H04L 1/1825* (2013.01); *H04L 1/1845* (2013.01); *H04L 1/1893* (2013.01); *H04L 5/006* (2013.01); *H04L 5/0055* (2013.01); *H04L 1/0026* (2013.01)

(56) References Cited

U.S. PATENT DOCUMENTS

| | | | | |
|---|---|---|---|---|
| 8,929,472 | B1* | 1/2015 | Lee | H04B 7/0885 375/267 |
| 2004/0153909 | A1* | 8/2004 | Lim | H04L 1/0009 714/714 |
| 2005/0073947 | A1* | 4/2005 | Dey | H04L 25/0218 370/208 |
| 2006/0195756 | A1* | 8/2006 | Yoshii | H03M 13/29 714/755 |
| 2006/0209779 | A1* | 9/2006 | Rousu | G01S 19/21 370/343 |
| 2007/0032199 | A1* | 2/2007 | Chang | H04L 1/0026 455/69 |
| 2007/0245203 | A1* | 10/2007 | Cho | H04L 1/0009 714/748 |
| 2008/0298387 | A1 | 12/2008 | Lohr et al. | |
| 2009/0219851 | A1* | 9/2009 | Abraham | H04L 1/1812 370/315 |
| 2009/0285116 | A1* | 11/2009 | Nanda | H04W 72/02 370/252 |
| 2010/0017674 | A1 | 1/2010 | Mo et al. | |
| 2010/0027704 | A1* | 2/2010 | Ho | H04L 1/0041 375/267 |
| 2011/0261684 | A1* | 10/2011 | Li | H04B 7/0682 370/225 |
| 2013/0165119 | A1* | 6/2013 | Lee | H04W 76/026 455/435.2 |
| 2014/0376473 | A1* | 12/2014 | Leng | H04L 5/0053 370/329 |
| 2015/0160991 | A1* | 6/2015 | Stojanovic | H03M 13/015 714/703 |
| 2015/0172931 | A1* | 6/2015 | Jose | H04W 16/14 370/329 |
| 2016/0037524 | A1* | 2/2016 | Krzymien | H04L 27/2601 370/329 |
| 2016/0227425 | A1* | 8/2016 | Kim | H04L 1/1812 |
| 2016/0285537 | A1* | 9/2016 | Maaref | H04B 7/14 |
| 2017/0135121 | A1* | 5/2017 | Eyuboglu | H04W 72/12 |

FOREIGN PATENT DOCUMENTS

| | | |
|---|---|---|
| CN | 1798012 A | 7/2006 |
| CN | 102340871 A | 2/2012 |
| KR | 20160010848 A | 1/2016 |
| TW | 201251497 A | 12/2012 |
| WO | WO-2010123893 A1 | 10/2010 |
| WO | WO-2015094751 A1 | 6/2015 |

OTHER PUBLICATIONS

CMCC, "DL HARQ Transmission for LAA", 3GPP TSG-RAN WG2 Meeting #89Bis, R2-151537, Bratislava, Slovakia, Apr. 20-24, 2015, 4 pgs., 3rd Generation Partnership Project.

ISA/EP, International Search Report and Written Opinion of the International Searching Authority, Int'l Application No. PCT/US2016/045802, Oct. 13, 2016, European Patent Office, Rijswijk, NL, 12 pgs.

ITRI, "Views on PHY Layer Options for LAA", 3GPP TSG RAN WG1 Meeting #80, R1-150422, Athens, Greece, Feb. 9-13, 2015, 3 pgs., 3rd Generation Partnership Project.

NEC, "Discussion on Downlink Cross Carrier HARQ", 3GPP TSG RAN WG1 Meeting #81, R1-152682, Fukuoka, Japan, May 25-29, 2015, 2 pgs., 3rd Generation Partnership Project.

Taiwan Search Report—TW150124281—TIPO—dated Feb. 10, 2020 (153065TW).

3GPP TR 36.912 V0.2.0, Technical Report, 3rd Generation Partnership Project; Technical Specification Group Radio Access Network; Feasibility study for Further Advancements for E-UTRA (LTE-Advanced) (Release 9), Aug. 2009, 31 pgs.

CMCC: "Discussion on HARQ Transmission for LAA," 3GPP TSG RAN WG1 Ad-hoc Meeting, R1-150993, Mar. 24-26, 2015, 4 pages.

* cited by examiner

1700

RELIABLE CHANNEL ASSISTED HYBRID-ARQ

BACKGROUND

The following relates generally to wireless communication and, more specifically, to reliable channel assisted hybrid automatic repeat request (HARQ).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN) such as a Wi-Fi (i.e., IEEE 802.11) network, may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the STA, and the UL (or reverse link) may refer to the communication link from the STA to the AP.

Wireless communication may be subject to loss or distortion during transmission, which may result in a receiver failing to decode the transmission. Some wireless systems may incorporate error-correction techniques to improve transmission reliability. For example, a transmitter may repeatedly send a lost packet, or error-correcting bits such as parity bits may be transmitted. A receiver may use the retransmission to improve the chances of successful packet decoding. Retransmissions may increase network overhead and may place requirements on the receiver hardware.

SUMMARY

A transmitter may receive feedback that a station failed to decode a packet sent over a first channel, and the transmitter may determine to re-send the packet or to send parity bits over the first channel or over a second channel to assist the station in decoding the failed packet. The first channel may be in an unlicensed radio frequency spectrum band, and the second channel may be in a licensed radio frequency spectrum band and may have a higher reliability level compared to the first channel. The transmitter may determine the reliability level of each channel, which may be based on a channel quality indicator for each channel. The transmitter may determine a degradation level of the first channel, which may be based on a signal-to-noise ratio received from the station, and may determine an amount of parity bits to send based on the degradation.

A method of wireless communication is described. The method may include receiving, from a transmitter, a packet on a first channel in an unlicensed radio frequency spectrum band, the first channel associated with a first level of reliability, and transmitting, to the transmitter, feedback identifying that the packet was unsuccessfully decoded. The method may further include receiving, from the transmitter, a transmission based at least in part on the identified packet on either the first channel in the unlicensed radio frequency spectrum band or a second channel in a licensed radio frequency spectrum band, where the second channel may be associated with a second level of reliability that is greater than the first level of reliability.

An apparatus for wireless communication is described. The apparatus may include means for receiving, from a transmitter, a packet on a first channel in an unlicensed radio frequency spectrum band, the first channel associated with a first level of reliability, and means for transmitting, to the transmitter, feedback identifying that the packet was unsuccessfully decoded. The apparatus may further include means for receiving, from the transmitter, a transmission based at least in part on the identified packet on either the first channel in the unlicensed radio frequency spectrum band or a second channel in a licensed radio frequency spectrum band, the second channel associated with a second level of reliability that is greater than the first level of reliability.

A further apparatus for wireless communication is described. The apparatus may include a processor, memory in electronic communication with the processor, and instructions stored in the memory and operable, when executed by the processor, to cause the apparatus to receive, from a transmitter, a packet on a first channel in an unlicensed radio frequency spectrum band, the first channel associated with a first level of reliability, and transmit, to the transmitter, feedback identifying that the packet was unsuccessfully decoded. The instructions may further cause the apparatus to receive, from the transmitter, a transmission based at least in part on the identified packet on either the first channel in the unlicensed radio frequency spectrum band or a second channel in a licensed radio frequency spectrum band, the second channel associated with a second level of reliability that is greater than the first level of reliability.

A non-transitory computer-readable medium storing code for wireless communication is described. The code may include instructions executable to receive, from a transmitter, a packet on a first channel in an unlicensed radio frequency spectrum band, the first channel associated with a first level of reliability, and transmit, to the transmitter, feedback identifying that the packet was unsuccessfully decoded. The code may include further instructions executable to receive, from the transmitter, a transmission based at least in part on the identified packet on either the first channel in the unlicensed radio frequency spectrum band or a second channel in a licensed radio frequency spectrum band, the second channel associated with a second level of reliability that is greater than the first level of reliability.

Some examples of the method, apparatuses, or non-transitory computer-readable medium described herein may further include processes, features, means, or instructions for storing the packet that was unsuccessfully decoded in a buffer, receiving, from the transmitter on the first channel or the second channel, extended parity bits associated with the identified packet, and decoding the stored packet using the received extended parity bits. Additionally or alternatively, some examples may include processes, features, means, or instructions for storing the packet that was unsuccessfully decoded in a buffer, receiving, from the transmitter on the first channel or the second channel, a second packet based at least in part on the packet that was unsuccessfully decoded, combining the stored packet and the second packet, and decoding the combined packet.

Some examples of the method, apparatuses, or non-transitory computer-readable medium described herein may further include processes, features, means, or instructions for determining a signal-to-noise ratio of the first channel and transmitting the signal-to-noise ratio to the transmitter.

A method of wireless communication is described. The method may include transmitting, to a receiving device, a packet on a first channel in an unlicensed radio frequency spectrum band, the first channel associated with a first level of reliability, and receiving feedback identifying that the packet was unsuccessfully decoded by the receiving device. The method may further include determining a level of degradation of the first channel, selecting between the first channel in the unlicensed radio frequency spectrum band or a second channel in a licensed radio frequency spectrum band based at least in part on the level of degradation of the first channel, the second channel associated with a second level of reliability that is greater than the first level of reliability, and transmitting, to the receiving device, on the selected channel, where the transmission is based at least in part on the identified packet.

An apparatus for wireless communication is described. The apparatus may include means for transmitting, to a receiving device, a packet on a first channel in an unlicensed radio frequency spectrum band, the first channel associated with a first level of reliability, and means for receiving feedback identifying that the packet was unsuccessfully decoded by the receiving device. The apparatus may further include means for determining a level of degradation of the first channel, means for selecting between the first channel in the unlicensed radio frequency spectrum band or a second channel in a licensed radio frequency spectrum band based at least in part on the level of degradation of the first channel, the second channel associated with a second level of reliability that is greater than the first level of reliability, and means for transmitting, to the receiving device, on the selected channel, where the transmission is based at least in part on the identified packet.

A further apparatus for wireless communication is described. The apparatus may include a processor, memory in electronic communication with the processor, and instructions stored in the memory and operable, when executed by the processor, to cause the apparatus to transmit, to a receiving device, a packet on a first channel in an unlicensed radio frequency spectrum band, the first channel associated with a first level of reliability, and receive feedback identifying that the packet was unsuccessfully decoded by the receiving device. The instructions may further cause the apparatus to determine a level of degradation of the first channel, select between the first channel in the unlicensed radio frequency spectrum band or a second channel in a licensed radio frequency spectrum band based at least in part on the level of degradation of the first channel, the second channel associated with a second level of reliability that is greater than the first level of reliability, and transmit, to the receiving device, on the selected channel, where the transmission is based at least in part on the identified packet.

A non-transitory computer-readable medium storing code for wireless communication is described. The code may include instructions executable to transmit, to a receiving device, a packet on a first channel in an unlicensed radio frequency spectrum band, the first channel associated with a first level of reliability, and receive feedback identifying that the packet was unsuccessfully decoded by the receiving device. The code may include instructions further executable to determine a level of degradation of the first channel, select between the first channel in the unlicensed radio frequency spectrum band or a second channel in a licensed radio frequency spectrum band based at least in part on the level of degradation of the first channel, the second channel associated with a second level of reliability that is greater than the first level of reliability, and transmit, to the receiving device, on the selected channel, where the transmission is based at least in part on the identified packet.

Some examples of the method, apparatuses, or non-transitory computer-readable medium described herein may further include processes, features, means, or instructions for determining an amount of extended parity bits associated with the identified packet to transmit based at least in part on the identified level of degradation of the first channel and transmitting the extended parity bits on the selected channel. Additionally or alternatively, some examples may include processes, features, means, or instructions for transmitting the identified packet on the selected channel based at least in part on the identified level of degradation of the first channel.

Some examples of the method, apparatuses, or non-transitory computer-readable medium described herein may further include processes, features, means, or instructions for receiving a signal-to-noise ratio of the first channel and determining a level of degradation of the first channel is based at least in part on the received signal-to-noise ratio. Additionally or alternatively, some examples may include processes, features, means, or instructions for determining a first channel quality indicator for the first channel, where the first level of reliability of the first channel is based at least in part on the first channel quality indicator, and determining a second channel quality indicator for the second channel, where the second level of reliability of the second channel is based at least in part on the second channel quality indicator.

In some examples of the method, apparatuses, or non-transitory computer-readable medium described herein, the feedback identifying packets that unsuccessfully decoded comprises a negative acknowledgment (NACK) message.

BRIEF DESCRIPTION OF THE DRAWINGS

Aspects of the disclosure are described in reference to the following figures.

DETAILED DESCRIPTION

Figure 1:
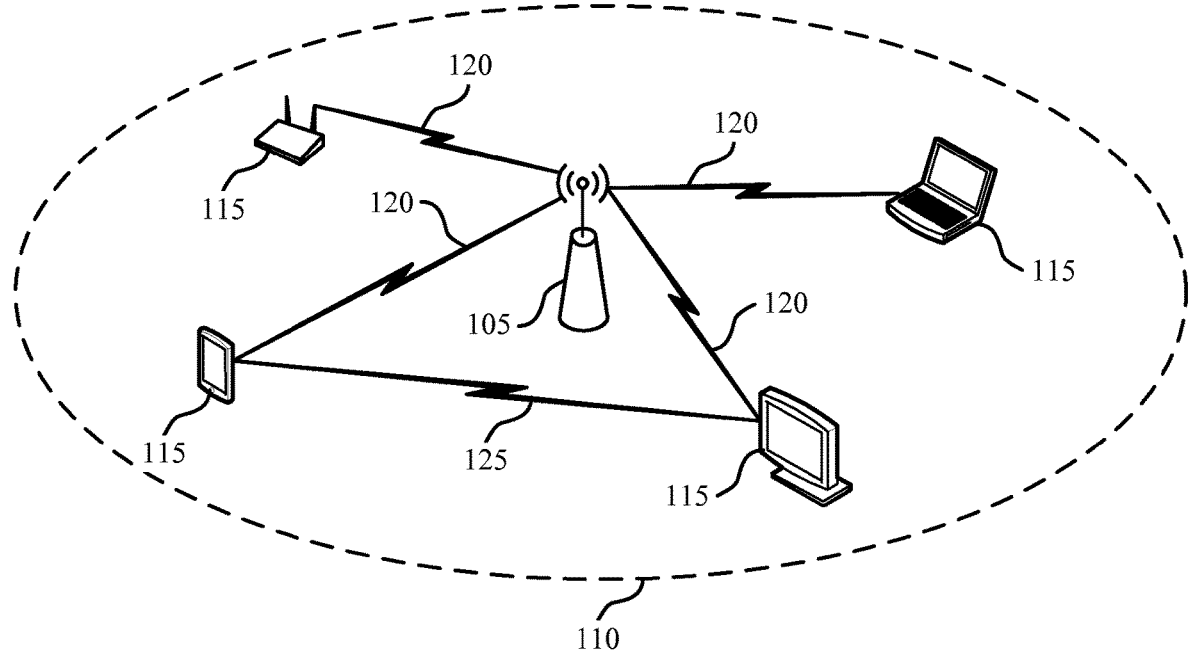
FIG. 1 illustrates a wireless local area network (WLAN) 100 (also known as a Wi-Fi network) for reliable channel assisted HARQ configured in accordance with various aspects of the present disclosure.

Wireless communications may be subject to loss or distortion due to path loss, noise, or other conditions, which may result in a receiver failing to decode packets. Some wireless communications systems may use error-correction techniques to improve reliability. Some techniques may involve sending a transmission in response to receiving an indication that a packet failed to decode. The receiver may then use the newly received information to successfully decode the failed packet. In some cases, instead of re-transmitting the entire packet, a few bits, such as parity bits, may only be needed to decode the failed packet. Because the original transmission sent over the first channel was corrupted, it may be beneficial to send the parity bits over a second channel that is more reliable than the first channel.

Error-correction techniques may include automatic repeat request (ARQ), where the transmitter may repeatedly send duplicate versions of the failed packet. Other techniques include hybrid ARQ (HARQ), where re-transmitted packets may include modifications to the data. For example, the bits of retransmitted packets in HARQ may be encoded with an error-correction code. In some cases, parity bits may be used with the error-correction code. Parity bits may indicate whether the total number of bits in a string with the value equal to one is even or odd. Parity bits may be transmitted with the packet or may be sent after notification that a packet failed to decode. In some cases, the receiver may store the failed packet and use the second transmission to decode the failed packet. For example, the receiver may combine the failed packet with the retransmitted packet, i.e., soft combine, and then decode, or the receiver may use the newly received parity bits to decode the failed packet.

In a system where a reliable side-channel exists between the access point (AP) and the mobile device or station (STA), it may be better to use this channel to perform error-correction for a previously failed transmission. For example, if the packet degradation is not severe, then successful decoding may be accomplished by transmitting extended parity bits. Since the more reliable channel may place an increased burden on the AP for use, an information content estimator at the transmitter may decide how many extra bits to send over the more reliable channel. Based on the channel conditions and the number of extra bits to send, the transmitter may decide whether to transmit over the more reliable channel.

In one embodiment, an AP may communicate with a mobile device on a first channel and a second, more-reliable channel may exist as well. For example, a non-license-assisted Wi-Fi channel may be an example of the first channel, and a license-assisted Wi-Fi channel may be an example of the second, more-reliable channel. The licensed band may be more robust because of enhanced interference management techniques or because of the potential to achieve a higher signal-to-noise ratio (SNR) budget by power pooling gains, for example, by using orthogonal frequency-division multiple access (OFDMA) or by using transmit beamforming. The AP may transmit to the mobile device over the first channel. If the mobile device fails to decode a packet, it may send a negative acknowledgment (NACK) to indicate the failure and may store the failed packet in a buffer. Additional bits may then be sent on the more reliable channel. These bits may appear as perfectly reliable HARQ bits at the receiver. In this case, repetition may be wasteful and the extra bits may represent extended parity bits. Parity bits sent on the more reliable channel may represent extra parity check equations at the receiver that may lower the code rate and may enable the receiver to decode the failed packet.

A receiver may estimate the SNR when decoding fails and may send the estimated SNR to the AP with an indication that decoding failed. Then the AP may determine the number extra parity bits to transmit to the receiver and over which channel. Blocks with larger degradation (e.g., the appearance of strong interferer or low SNR) may be dealt with by retransmitting the packet (e.g., chase combining) over the first, less reliable channel. Blocks requiring a small increment (medium to high SNR cases) may be extended with a small number of bits sent over the second, more reliable channel. The transmitter may use an information content estimator to compute the number of bits to resend.

The AP may determine over which channel to transmit the extra bits to the receiver. In some cases, this may depend on the received SNR estimated by the receiver. The AP may keep track of channel quality indicator (CQI) reports of one or more available channels. Depending on the severity of the degradation at the receiver, the AP may decide whether to use the more reliable channel or not. One advantage the more reliable channel affords is the receiver may use a smaller buffer to store the extra bits. For example, if extra bits are sent over the less reliable channel, then for optimal decoding it may be necessary to use soft combining, i.e., receiving a second packet of similar size as the first, which leads to larger memory requirements at the receiver.

Aspects of the disclosure are initially described in the context of a wireless communication system. Specific examples are then described for sending parity bits over a second channel that is more reliable than the first. These and other aspects of the disclosure are further illustrated by and described with reference to apparatus diagrams, system diagrams, and flowcharts that relate to reliable channel assisted HARQ.

FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system (DS) (not shown) that may allow multiple APs 105 to be connected in an ESS. In some cases, WLAN 100 may contain channels in both a licensed and unlicensed radio frequency spectrum band, and APs 105 may transmit over either channel based on the transmission and the levels of reliability of each channel.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. In some cases, the coverage area 110 of an AP 105 may be divided into sectors (also not shown). The WLAN network 100 may include APs 105 with coverage areas 110 of different types (e.g., metropolitan area, home network, etc.), with varying and overlapping coverage areas 110. Two STAs 115 may also communicate directly via a communication link 125 regardless of whether both STAs 115 are in the same coverage area 110. Examples of communication links 120 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within WLAN network 100.

Data may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, dedicated traffic channel (DTCH) for dedicated STA data, and multicast traffic channel (MTCH) for multicast data. Downlink (DL) transport channels may include broadcast channel (BCH) for broadcast information, a downlink shared channel (DL-SCH) for data transfer, paging channel (PCH) for paging information, and multicast channel (MCH) for multicast transmissions. Uplink (UL) transport channels may include random access channel (RACH) for access and uplink shared channel (UL-SCH) for data. DL physical channels may include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, physical uplink control channel (PUCCH) for control data, and physical uplink shared channel (PUSCH) for user data. In some cases, an AP may have the option to transmit over a channel in an unlicensed radio frequency spectrum and or over a licensed radio frequency spectrum band. These transmissions may be related to error-correction for packets that failed to decode, for example, by re-sending the failed packets or sending extended parity bits associated with the failed packets.

One possible error-correction technique that may be employed is HARQ. HARQ may be a method of ensuring that data is received correctly over a wireless communication link 125. HARQ may include a combination of error detection (e.g., using a cyclic redundancy check (CRC)), forward error correction (FEC), or retransmission (e.g., ARQ). HARQ may improve throughput at the MAC layer in poor radio conditions (e.g., low signal-to-noise ratio conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission but are retransmitted after the transmitter of the original message receives a negative acknowledgement (NACK) indicating a failed attempt to decode the information. In some cases, parity bits may be transmitted with the message or after receiving a NACK. Parity bits may indicate whether the total number of bits in a string with the value equal to one is even or odd. The chain of transmission, response, and retransmission may be referred to as a HARQ process. In some cases, a limited number of HARQ processes may be used for a given communication link 125. In some cases, communication link 125 may be in an unlicensed radio frequency spectrum band or in a licensed radio frequency spectrum band.

An AP 105 may gather channel condition information from a STA 115 in order to efficiently configure and schedule the channel. This information may be sent from the STA 115 in the form of a channel state report. A channel state report may contain a rank indicator (RI) requesting a number of layers to be used for DL transmissions (e.g., based on the antenna ports of the STA 115), a precoding matrix indicator (PMI) indicating a preference for which precoder matrix should be used (based on the number of layers), and a channel quality indicator (CQI) representing the highest modulation and coding scheme (MCS) that may be used. In some cases, the channel state report may include a signal-to-noise ratio of the transmission channel, or the STA 115 may separately send a signal-to-noise ratio to the AP 105. CQI may be calculated by a STA 115 after receiving predetermined pilot symbols such as cell-specific reference signals (CRS) or channel state information (CSI)-RS. The types of information included in the report determines a reporting type. Channel state reports may be periodic or aperiodic. That is, a AP 105 may configure a STA 115 to send periodic reports at regular intervals, and may also request additional reports as needed. Aperiodic reports may include wideband reports indicating the channel quality across an entire cell bandwidth, STA selected reports indicating a subset of the best subbands, or configured reports in which the subbands reported are selected by the AP 105.

Thus, as described herein, an AP 105 may receive feedback that a STA 115 failed to decode a packet sent over a first channel, and the AP 105 may determine to re-send the packet or to send parity bits over the first channel or over a second channel to assist the STA 115 in decoding the failed packet. The first channel may be in an unlicensed radio frequency spectrum band, and the second channel may be in a licensed radio frequency spectrum band and may have a higher reliability level compared to the first channel. The AP 105 may determine a first channel degradation level, which may be based on a signal-to-noise ratio received from the STA 115, and may determine an amount of parity bits to send based on the degradation. The AP 105 may determine the reliability level of each channel, which may be based on a channel quality indicator for each channel.

Figure 2:
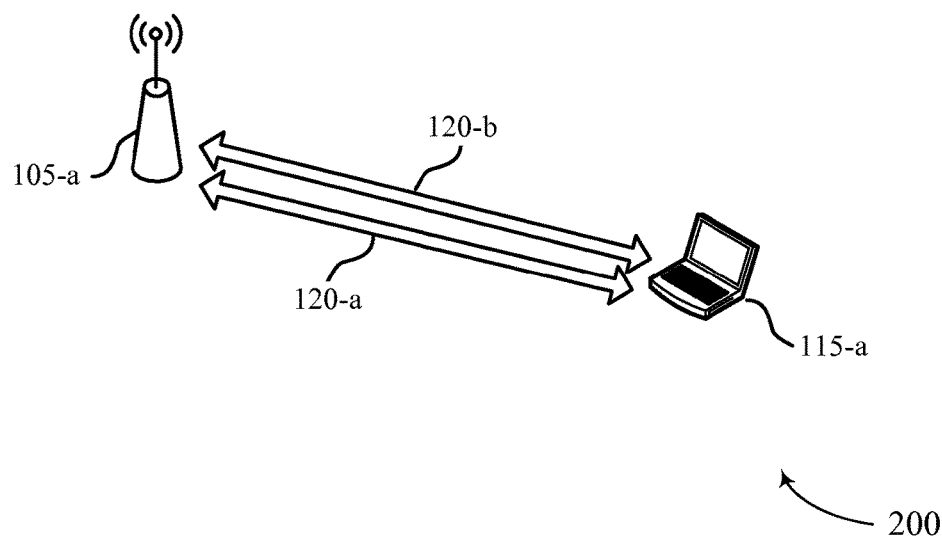
FIG. 2 illustrates an example of a wireless communications subsystem that supports reliable channel assisted HARQ in accordance with various aspects of the present disclosure.

FIG. 2 illustrates an example of a wireless communications subsystem 200 for reliable channel assisted HARQ in accordance with various aspects of the present disclosure. Wireless communications subsystem 200 may include a STA 115-a and AP 105-a, which may be examples of a STA or 115 AP 105, respectively, as described with reference to FIG. 1. AP 105-a may communicate with STA 115-a through communication link 120-a, which may be in an unlicensed radio frequency spectrum, and may be associated with a first level of reliability. AP 105-a may also communicate with STA 115-a through communication link 120-b, which may be in a licensed radio frequency spectrum, and may be associated with a second level of reliability. As described herein, AP 105-a may determine to transmit over communication link 120-*a* or 120-*b* based on the data to be transmitted and the levels of reliability of the two channels.

Wireless communications subsystem 200 may be subject to loss or distortion due to path loss, noise, or other conditions, which may result in STA 115-*a* failing to decode packets received from AP 105-*a*. Wireless communications subsystem 200 may use error-correction techniques to improve reliability. For example, it may use ARQ, where AP 105-*a* may repeatedly send duplicate versions of the failed packet. In some cases, the transmission may include redundant bits used for error detection. Wireless communications subsystem 200 may also employ HARQ, where re-transmitted packets may include modification to the data. For example, the bits of retransmitted packets may be encoded with an error-correction code. In some cases, parity bits may be used with the error-correction code. Parity bits may indicate whether the total number of bits in a string with the value equal to one is even or odd. Parity bits may be transmitted with the packet or may be sent after notification that a packet failed to decode. In some cases, STA 115-*a* may store the failed packet and combine it with a retransmitted packet, i.e., soft combine, or STA 115-*a* may use newly received parity bits to decode the failed packet.

In standard HARQ, additional parity bits may be soft values that may be either combined with previous soft values (chase combining) or represent parity extension (incremental redundancy). In chase combining, every re-transmission may contain the same data and parity bits, and STA 115-*a* may combine the re-transmission with the same bits from previous transmissions. In incremental redundancy, every re-transmission may contain different information than previous transmissions, where multiple sets of coded bits representing the same set of information bits are generated.

Wireless communications subsystem 200 may include a reliable side-channel (e.g., communication link 120-*b*) between AP 105-*a* and STA 115-*a*. In some cases, it may be better to use this channel to perform error-correction for a previously failed transmission. For example, if the packet degradation is not severe, then successful decoding may be accomplished by transmitting extended parity bits. Since the more reliable channel may place an increased burden on AP 105-*a* for use, an information content estimator at AP 105-*a* may decide how many extra bits to send over the more reliable channel to STA 115-*a*. Based on the channel conditions and the number of extra bits to send, AP 105-*a* may decide whether to transmit over the more reliable channel.

In some cases, AP 105-*a* may communicate with STA 115-*a* on a first channel (e.g., communication link 120-*a*), and a second, more-reliable channel may exist as well (e.g., communication link 120-*b*). For example, a non-license-assisted Wi-Fi channel may be an example of communication link 120-*a*, and a license-assisted Wi-Fi channel may be an example of communication link 120-*a*. The licensed band may be more robust because of enhanced interference management techniques or because of the potential to achieve a higher signal-to-noise ratio (SNR) budget by 'power pooling' gains, for example, by using orthogonal frequency-division multiple access (OFDMA) or by using transmit beamforming. AP 105-*a* may transmit to STA 115-*a* over the first channel. If STA 115-*a* fails to decode a packet, it may send a negative acknowledgment (NACK) to indicate the failure and may store the failed packet in a buffer. Additional bits may then be sent over communication link 120-*b*. These bits may appear as perfectly reliable HARQ bits at STA 115-*a*. In this case, repetition may be wasteful and the extra bits may represent extended parity bits. For example, at high SNR one has $\Sigma(SNR) \geq C(\Sigma SNR)$, where C denotes the Shannon capacity for that constellation. Parity bits sent on the more reliable channel may represent extra parity check equations at STA 115-*a* that may lower the code rate and may enable STA 115-*a* to decode the failed packet.

STA 115-*a* may estimate the SNR when decoding fails and may send the estimated SNR to AP 105-*a* with an indication that decoding failed. Then AP 105-*a* may determine the number of extra parity bits to transmit to the receiver and over which communication link. Blocks with larger degradation (e.g., due to the appearance of strong interferer or low SNR) may be dealt with by retransmitting the packet (chase combining) over the first channel (communication link 120-*a*). Blocks requiring a small increment (medium to high SNR cases) may be extended with a small number of bits sent over the second, more reliable channel (communication link 120-*b*). AP 105-*a* may use an information content estimator to compute the number of bits to resend, N, where $LC_M(SNR_{instantaneous})+N=LC_M(SNR_{desired})$ and L is the number of original transmitted coded symbols, N is the number of bits to be sent on the more reliable channel (communication link 120-*b*), $C_M(x)$ is the capacity of the additive white Gaussian noise (AWGN) channel under constellation M evaluated at x.

AP 105-*a* may determine which communication link to use to send the extra bits to STA 115-*a*. In some cases, this may depend on the received SNR estimated by STA 115-*a*. AP 105-*a* may keep track of channel quality indicator (CQI) reports of one or more available channels, for example, communication links 120-*a* and 120-*b*. Depending on the severity of the degradation at STA 115-*a*, AP 105-*a* may decide whether to use the more reliable channel (communication link 120-*b*) or not. One advantage the more reliable channel (communication link 120-*b*) affords is that STA 115-*a* may use a smaller buffer to store the extra bits. For example, if extra bits are sent over the less reliable channel (communication link 120-*a*), then for optimal decoding it may be necessary to use soft combining, which may involve resending the original packet in its entirety, leading to larger memory requirements for STA 115-*a*.

Figure 3:
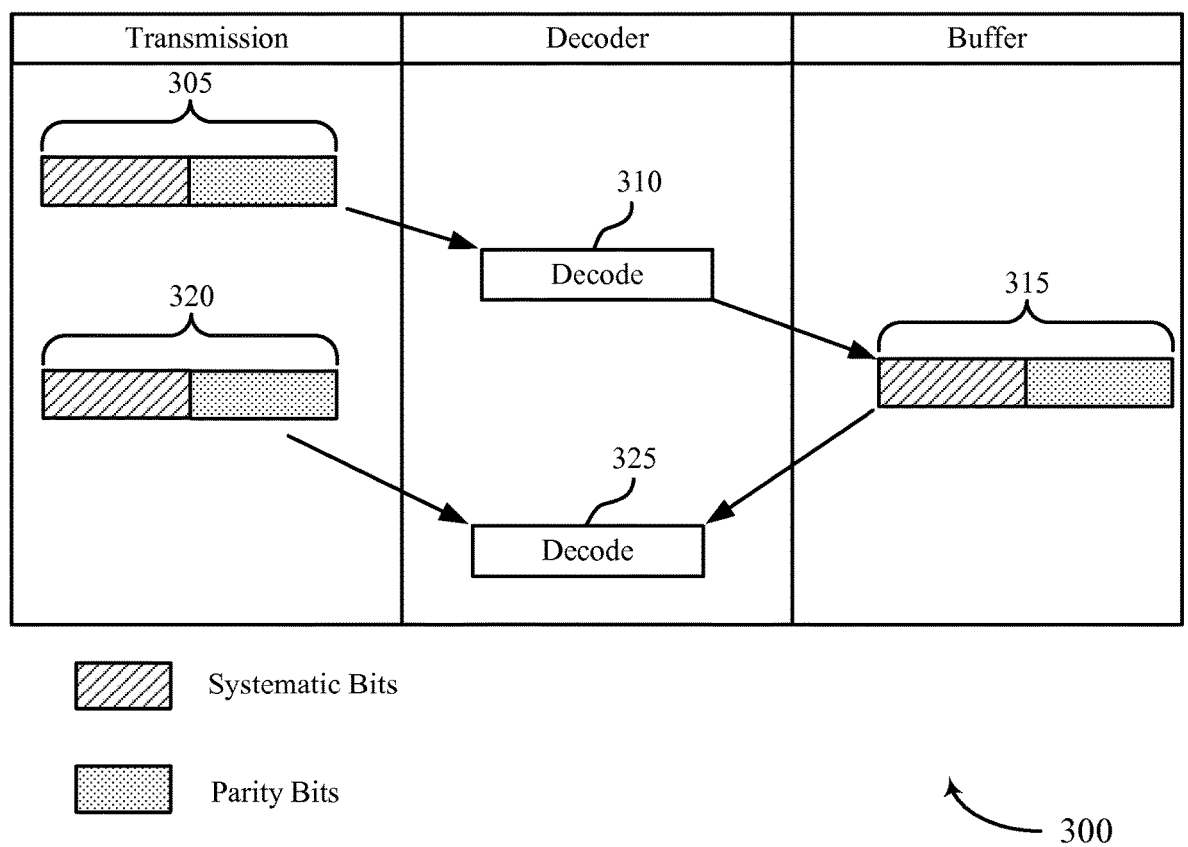
FIG. 3 illustrates an example of a signal decoding process that supports reliable channel assisted HARQ in accordance with various aspects of the present disclosure.

FIG. 3 illustrates an example of a signal decoding process 300 for reliable channel assisted HARQ in accordance with various aspects of the present disclosure. Signal decoding process 300 may include an exchange of packets or information between a STA 115 and an AP 105 as described in FIGS. 1-2. A STA 115 may store a packet that failed to decode, send a NACK to an AP 105, receive a second transmission in response to the NACK, and decode the failed packet based on the second transmission.

First transmission 305 may be sent from an AP 105 to a STA 115. First transmission 305 may contain multiple packets, which may include systematic bits or parity bits. Systematic bits may be data or information bits. The parity bits may be used for error correction and may help a STA 115 successfully decode the packet. First transmission 305 may be sent over a first channel with a first level of reliability.

In a first decoding process 310, a decoder of a STA 115 may attempt to decode first transmission 305 so that the receiving device (e.g., a STA 115) may correctly interpret the systematic bits of first transmission 305. If the first decoding process 310 fails, some or all of the packets of first transmission 305 may then be stored, for example, in a buffer. Buffered bits 315 may contain multiple packets, which may include systematic bits or the first set of parity bits received in first transmission 305.

A second transmission 320 may be sent if the transmitter receives a NACK message from the receiver, and second transmission 320 may be based on the packets identified in the NACK message. Second transmission 320 may contain multiple packets, which may include systematic bits or parity bits that may the same or different from those sent in first transmission 305. In some cases, second transmission 320 may only contain parity bits. In other cases, second transmission 320 may be the same as first transmission 305. Second transmission 320 may be sent over the first channel or over a second channel. The second channel may have a level of reliability greater than that of the first. The first channel may be in an unlicensed radio frequency spectrum band and the second channel may be in a licensed radio frequency spectrum band.

In a second decoding process 325, the receiver may attempt to decode the failed packet by using the second transmission 320. This may include soft-combining the buffered systematic bits 315 with the systematic bits received in the second transmission 320 or it may use buffered parity bits 315 and the parity bits contained in second transmission 320 to decode the buffered systematic bits 315.

Figure 4:
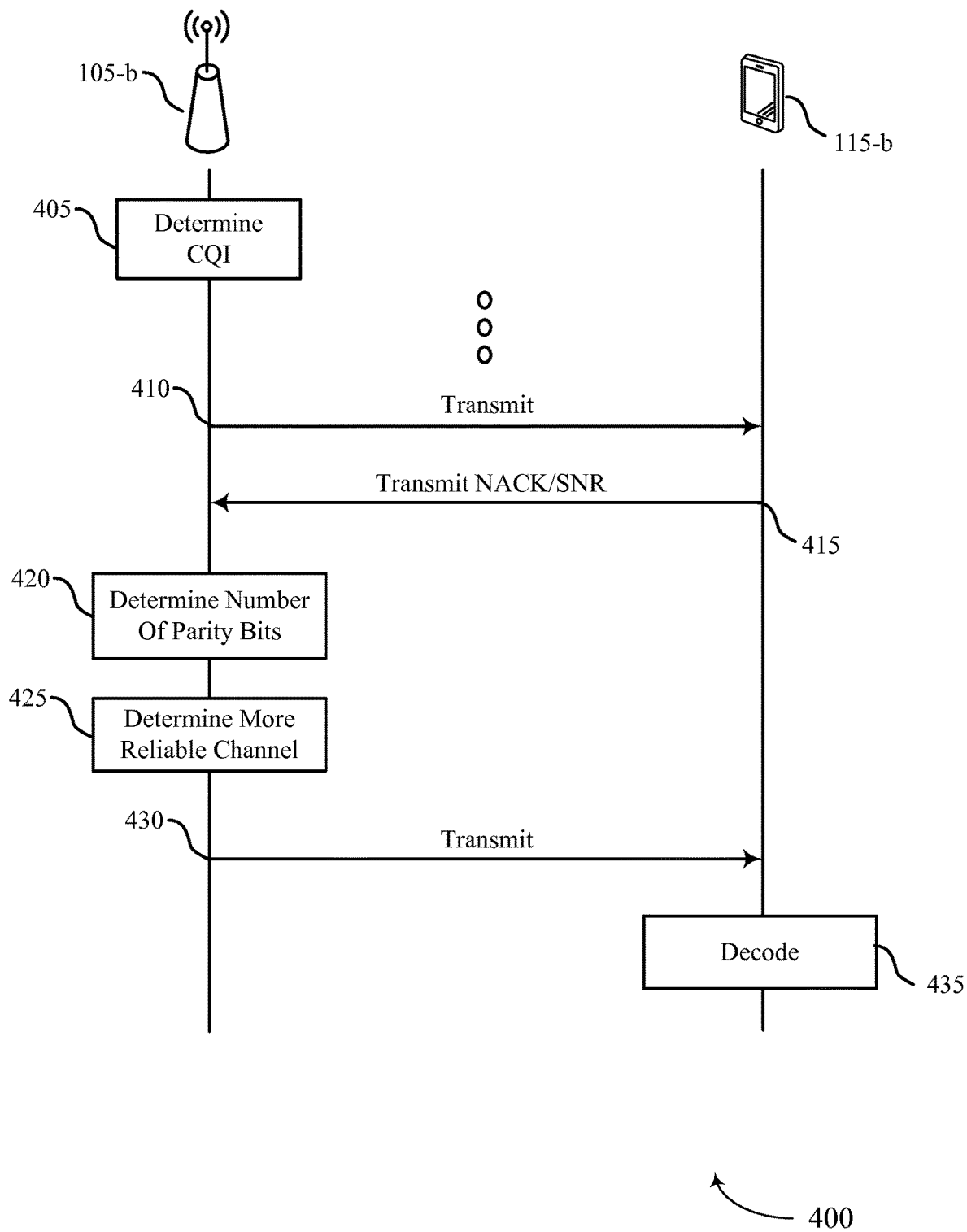
FIG. 4 illustrates an example of a process flow that supports reliable channel assisted HARQ in accordance with various aspects of the present disclosure.

FIG. 4 illustrates an example of a process flow 400 for reliable channel assisted HARQ in accordance with various aspects of the present disclosure. Process flow 400 may include a STA 115-b and an AP 105-b, which may be examples of a STA 115 and an AP 105 described with reference to FIGS. 1-2. AP 105-b may receive feedback that STA 115-b failed to decode a packet sent over a first channel, and AP 105-b may determine to re-send the packet or to send parity bits over the first channel or over a second channel to assist the station in decoding the failed packet. The second channel may have a level of reliability greater than that of the first channel.

At 405, AP 105-b may determine a channel quality indicator (CQI) for channels available for transmission. AP 105-b may determine a first channel quality indicator for a first channel, where a first level of reliability of the first channel may be based on the first channel quality indicator. AP 105-b may also determine a second channel quality indicator for a second channel, where a second level of reliability of the second channel may be based on the second channel quality indicator. In some cases, the second level of reliability may be greater than the first level of reliability.

At 410, AP 105-b may transmit packets to STA 115-b on the first channel. In some cases, the first channel may be in an unlicensed radio frequency spectrum band and associated with a first level of reliability.

At 415, STA 115-b may fail to decode the packets, and it may store the packets, for example, in a buffer. STA 115-b may send feedback to AP 105-b identifying the unsuccessfully decoded packet. In some cases, the feedback may be contained in a negative acknowledgment (NACK) message. In some cases, STA 115-b may determine a signal-to-noise ratio of the first channel and may transmit the signal-to-noise ratio to AP 105-b. In some examples, the signal-to-noise ratio may be transmitted with the NACK message.

Upon receiving the feedback identifying the unsuccessfully decoded packet, AP 105-b may, at 420, determine an amount of extended parity bits associated with the identified packet to transmit. This may include AP 105-b determining a level of degradation of the first channel, which may be based on the received signal-to-noise ratio of the first channel. In some cases, the number of extended parity bits to transmit may be based on the identified level of degradation of the first channel.

At 425, AP 105-b may select between the first channel or a second channel to transmit in response to the received NACK. The first channel may be in an unlicensed radio frequency spectrum band and the second channel may be in a licensed radio frequency spectrum band. The first channel may be associated with a first level of reliability and the second channel may associated with a second level of reliability that may be greater than the first level of reliability. AP 105-b may select the first or second channel based on the levels of reliability of the channels or based on the number of parity bits to send.

At 430, AP 105-b may transmit to STA 115-b on the selected channel, where the transmission may be based on the identified packet that previously failed to decode. AP 105-b may transmit the extended parity bits on the selected channel or it may transmit the identified packets that failed to decode on the selected channel based on the identified level of degradation of the first channel.

At 435, STA 115-b may decode the stored packet using the information sent in the transmission at 430. In some cases, STA 115-b may decode the packet using the received extended parity bits. In other cases, STA 115-b may soft-combine the received packets with the stored packets and then decode the combination.

Figure 5:
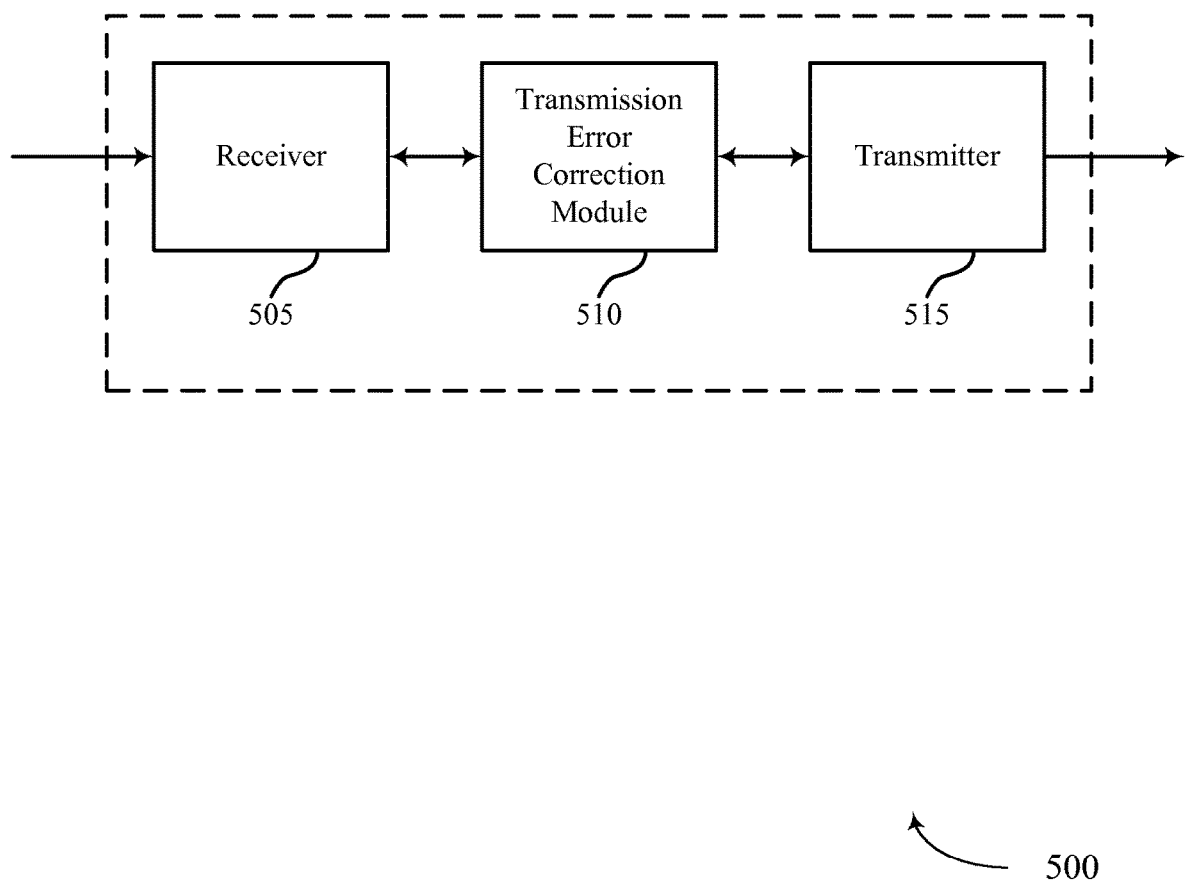
FIGS. 5-7 show block diagrams of a wireless device that supports reliable channel assisted HARQ in accordance with various aspects of the present disclosure.

FIG. 5 shows a block diagram of a wireless device 500 configured for reliable channel assisted HARQ in accordance with various aspects of the present disclosure. Wireless device 500 may be an example of aspects of a STA 115 described with reference to FIGS. 1-4. Wireless device 500 may include a receiver 505, a transmission error correction module 510, or a transmitter 515. Wireless device 500 may also include a processor. Each of these components may be in communication with each other.

The receiver 505 may receive information such as packets, user data, or control information associated with various information channels (e.g., control channels, data channels, and information related to reliable channel assisted HARQ, etc.). Information may be passed on to the transmission error correction module 510, and to other components of wireless device 500. In some examples, the receiver 505 may receive, from an AP, a packet on a first channel. In some cases, the first channel may be in an unlicensed radio frequency spectrum band and associated with a first level of reliability.

The transmission error correction module 510 may transmit, to the AP, feedback identifying that the packet was unsuccessfully decoded. Transmission error correction module 510 may then receive, from the AP, a transmission based on the identified packet on either the first channel or on a second channel. In some cases, the first channel may be in an unlicensed radio frequency spectrum band and the second channel may be in a licensed radio frequency spectrum band. The second channel may be associated with a second level of reliability that is greater than the first level of reliability of the first channel.

The transmitter 515 may transmit signals received from other components of wireless device 500, including the feedback identifying that a packet was unsuccessfully decoded. In some examples, the transmitter 515 may be collocated with the receiver 505 in a transceiver module. The transmitter 515 may include a single antenna, or it may include a plurality of antennas.

Figure 6:
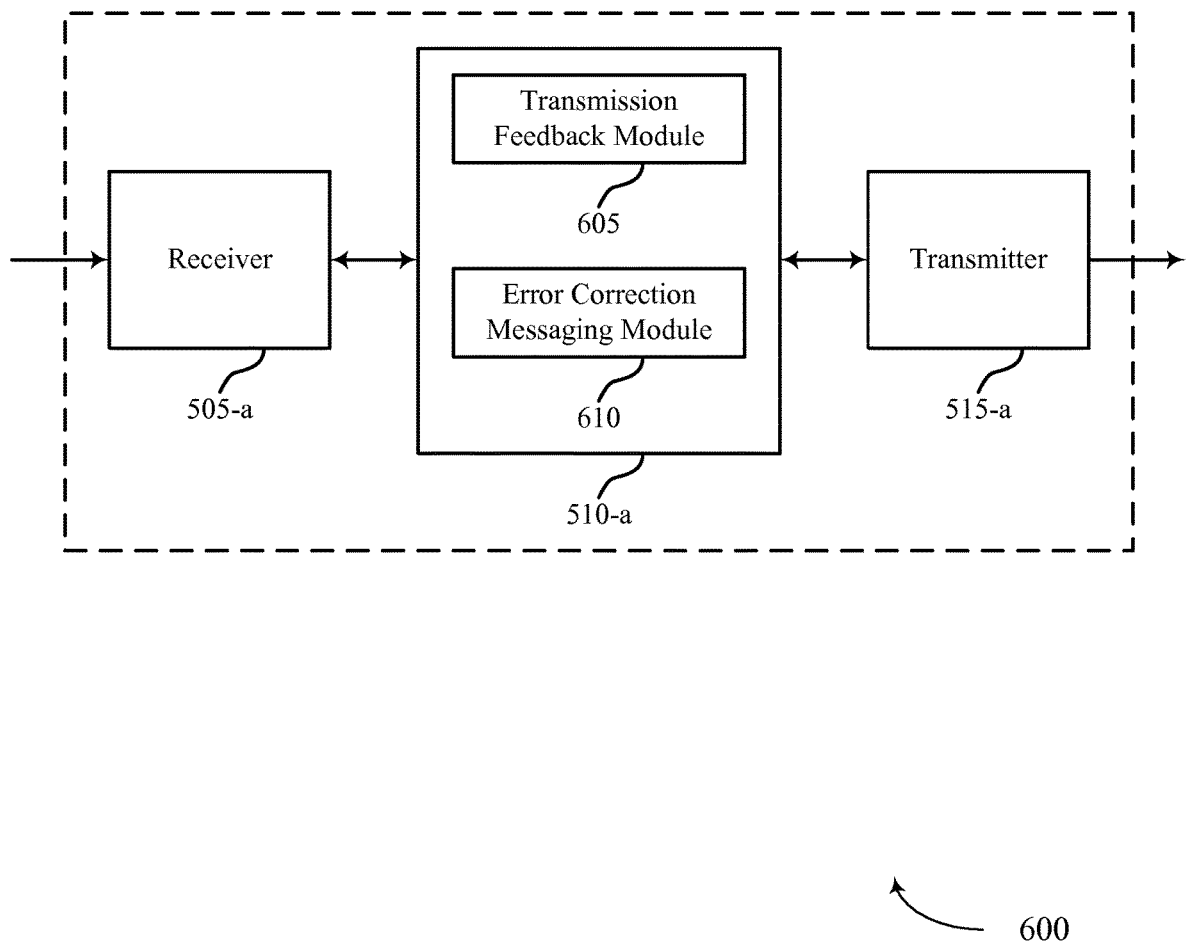

FIG. 6 shows a block diagram of a wireless device 600 for reliable channel assisted HARQ in accordance with various aspects of the present disclosure. Wireless device 600 may be an example of aspects of a wireless device 500 or a STA 115 described with reference to FIGS. 1-5. Wireless device 600 may include a receiver 505-a, a transmission error correction module 510-*a*, or a transmitter 515-*a*. Wireless device 600 may also include a processor. Each of these components may be in communication with each other. The transmission error correction module 510-*a* may also include a transmission feedback module 605 and an error correction messaging module 610.

The receiver 505-*a* may receive information which may be passed on to transmission error correction module 510-*a* and to other components of wireless device 600. The transmission error correction module 510-*a* may perform the operations described with reference to FIG. 5. The transmitter 515-*a* may transmit signals received from other components of wireless device 600.

The transmission feedback module 605 may transmit, to the AP, feedback identifying that the packet was unsuccessfully decoded as described with reference to FIGS. 2-4. In some examples, the feedback identifying packets that unsuccessfully decoded includes a negative acknowledgment (NACK) message.

The error correction messaging module 610 may receive, from the AP, a transmission based on the identified packet on either the first channel or on a second channel. The first channel may be in an unlicensed radio frequency spectrum band and the second channel may be in a licensed radio frequency spectrum band. In some cases, the second channel may be associated with a second level of reliability that is greater than the first level of reliability of the first channel as described with reference to FIGS. 2-4. The error correction messaging module 610 may also receive, from the AP on the first channel or the second channel, extended parity bits associated with the identified packet. In some examples, the error correction messaging module 610 may receive, from the AP on the first channel or the second channel, a second packet based at least in part on the packet that was unsuccessfully decoded.

Figure 7:
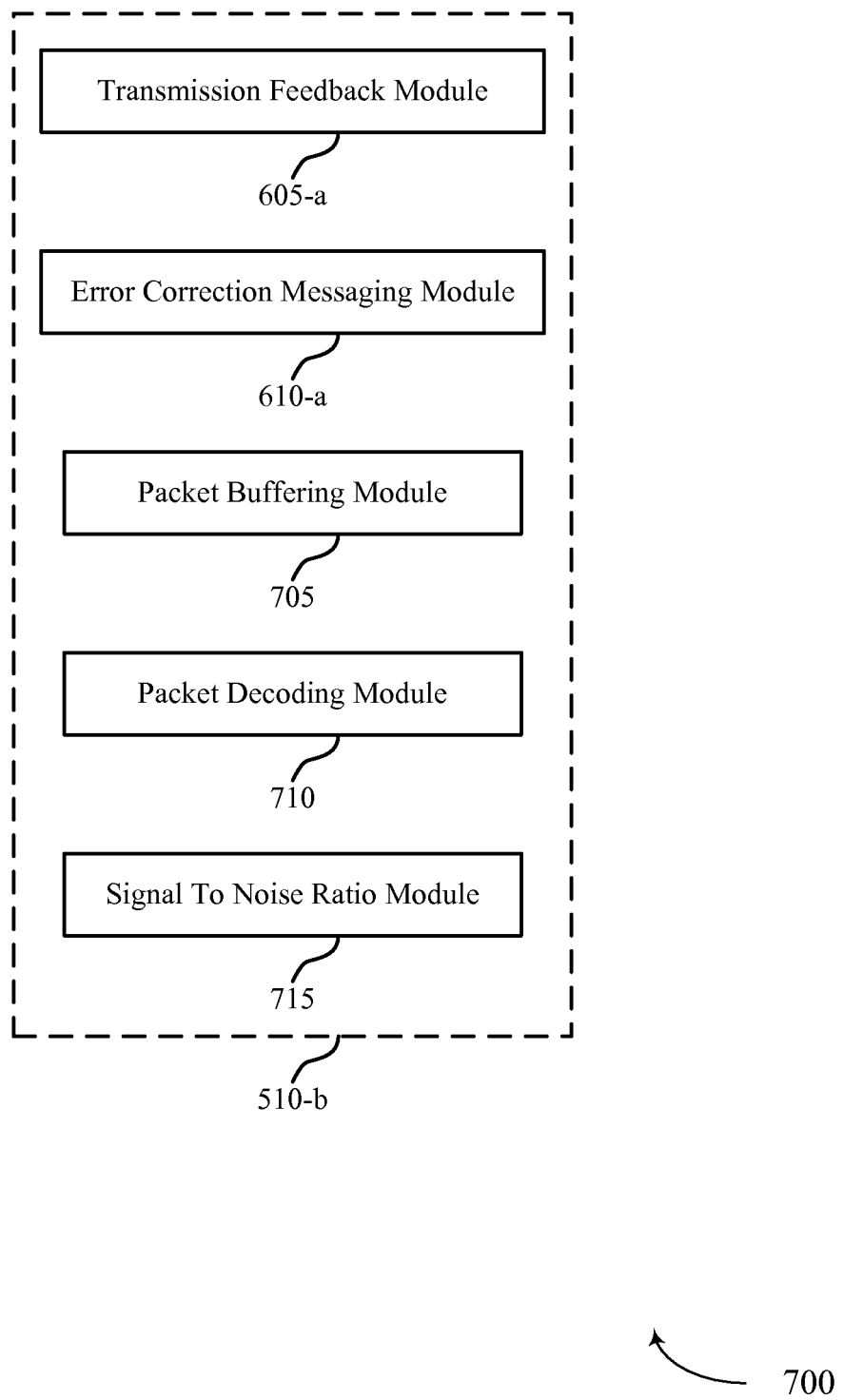

FIG. 7 shows a block diagram 700 of a transmission error correction module 510-*b* which may be a component of a wireless device 500 or a wireless device 600 for reliable channel assisted HARQ in accordance with various aspects of the present disclosure. The transmission error correction module 510-*b* may be an example of aspects of a transmission error correction module 510 described with reference to FIGS. 5-6. The transmission error correction module 510-*b* may include a transmission feedback module 605-*a* and an error correction messaging module 610-*a*. Each of these modules may perform the functions described with reference to FIG. 6. The transmission error correction module 510-*b* may also include a packet buffering module 705, a packet decoding module 710, and a signal-to-noise ratio module 715.

The packet buffering module 705 may store the packet that was unsuccessfully decoded in a buffer as described with reference to FIGS. 2-4. The packet decoding module 710 may decode the stored packet using the received extended parity bits as described with reference to FIGS. 2-4. The packet decoding module 710 may also combine the stored packet and the second packet and may also decode the combined packet.

The signal-to-noise ratio module 715 may determine a signal-to-noise ratio of the first channel as described with reference to FIGS. 2-4. The signal-to-noise ratio module 715 may also transmit the signal-to-noise ratio to the AP.

Figure 8:
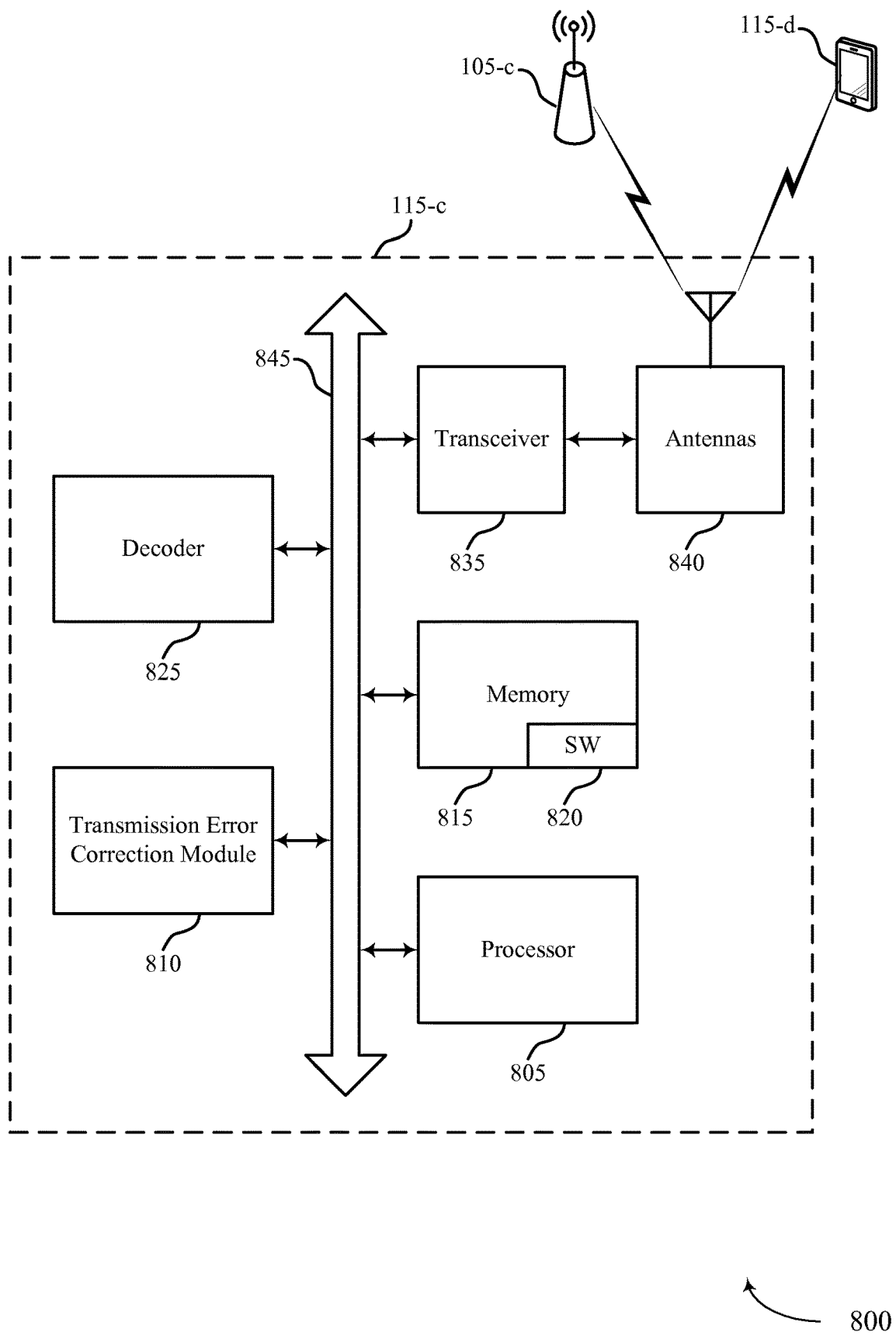
FIG. 8 illustrates a block diagram of a system including a STA that supports reliable channel assisted HARQ in accordance with various aspects of the present disclosure.

FIG. 8 shows a diagram of a system 800 including a STA 115 configured for reliable channel assisted HARQ in accordance with various aspects of the present disclosure. System 800 may include STA 115-*c*, which may be an example of a wireless device 500, a wireless device 600, or a STA 115 described with reference to FIGS. 1, 2, 4, and 5-7. STA 115-*c* may include a transmission error correction module 810, which may be an example of a transmission error correction module 510 described with reference to FIGS. 5-7. STA 115-*c* may also include a decoder 825. Decoder 825 may decode received transmissions and may contain a buffer to store packets that failed to decode. STA 115-*c* may also include components for bi-directional voice and data communications including components for transmitting communications and components for receiving communications. For example, STA 115-*c* may communicate bi-directionally with STA 115-*d* or AP 105-*c*.

STA 115-*c* may also include a processor 805, memory 815 (including software (SW) 820), a transceiver 835, and one or more antenna(s) 840, each of which may communicate, directly or indirectly, with one another (e.g., via bus 845). The transceiver 835 may communicate bi-directionally, via the antenna(s) 840 or wired or wireless links, with one or more networks as described above. For example, the transceiver 835 may communicate bi-directionally with AP 105-*c* or STA 115-*d*. The transceiver 835 may include a modem to modulate the packets and provide the modulated packets to the antenna(s) 840 for transmission. The modem may also demodulate packets received from the antenna(s) 840. While STA 115-*c* may include a single antenna 840, STA 115-*c* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., decoding, buffering, determining a signal-to-noise ratio etc.). Alternatively, the software/firmware code 820 may not be directly executable by the processor 805 but may cause a computer (e.g., when compiled and executed) to perform functions described herein. The processor 805 may include an intelligent hardware device, e.g., a central processing unit (CPU), a microcontroller, an application specific integrated circuit (ASIC), or the like.

Figure 9:
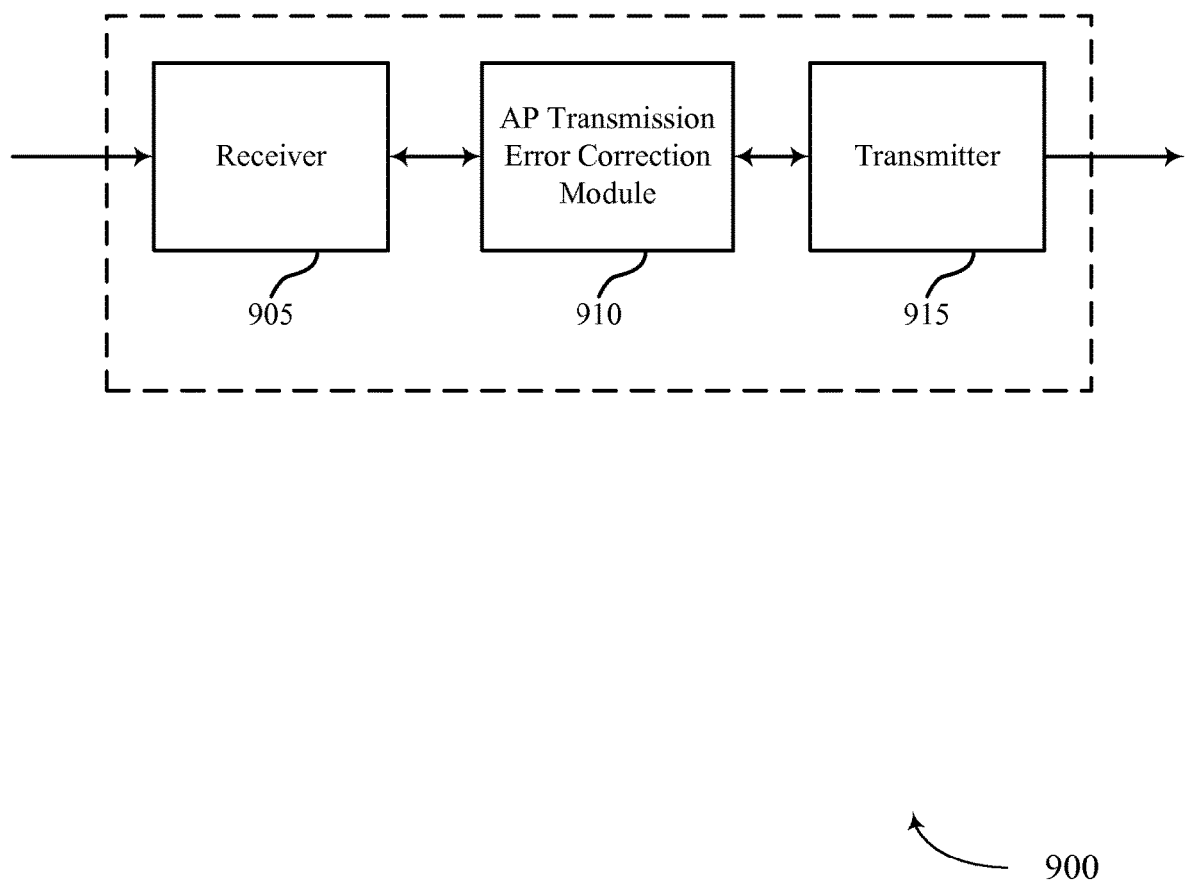
FIGS. 9-11 show block diagrams of a wireless device that supports reliable channel assisted HARQ in accordance with various aspects of the present disclosure.

FIG. 9 shows a block diagram of a wireless device 900 configured for reliable channel assisted HARQ in accordance with various aspects of the present disclosure. Wireless device 900 may be an example of aspects of an AP 105 described with reference to FIGS. 1-8. Wireless device 900 may include a receiver 905, an AP transmission error correction module 910, or a transmitter 915. Wireless device 900 may also include a processor. Each of these components may be in communication with each other.

The receiver 905 may receive information such as packets, user data, or control information associated with various information channels (e.g., control channels, data channels, and information related to reliable channel assisted HARQ, etc.). Information may be passed on to the AP transmission error correction module 910, and to other components of wireless device 900.

The AP transmission error correction module 910 may transmit, to a receiving device, a packet on a first channel and receive feedback identifying that the packet was unsuccessfully decoded by the receiving device. In some cases, the first channel may be in an unlicensed radio frequency spectrum band and associated with a first level of reliability. AP error correction module 910 may then determine a level of degradation of the first channel and select between the first channel or a second channel to transmit to the receiving device on the selected channel, where the transmission may be based on the identified packet. In some cases, the second channel may be in a licensed radio frequency spectrum band and associated with a second level of reliability that is greater than the first level of reliability. Error correction module 910 may select which channel based on the level of degradation or the level of reliability for each channel.

The transmitter 915 may transmit signals received from other components of wireless device 900, including signals from AP transmission error correction module 910. In some examples, the transmitter 915 may be collocated with the receiver 905 in a transceiver module. The transmitter 915 may include a single antenna, or it may include a plurality of antennas. In some examples, the transmitter 915 may transmit, to a receiving device, a packet on a first channel in an unlicensed radio frequency spectrum band, the first channel associated with a first level of reliability.

Figure 10:
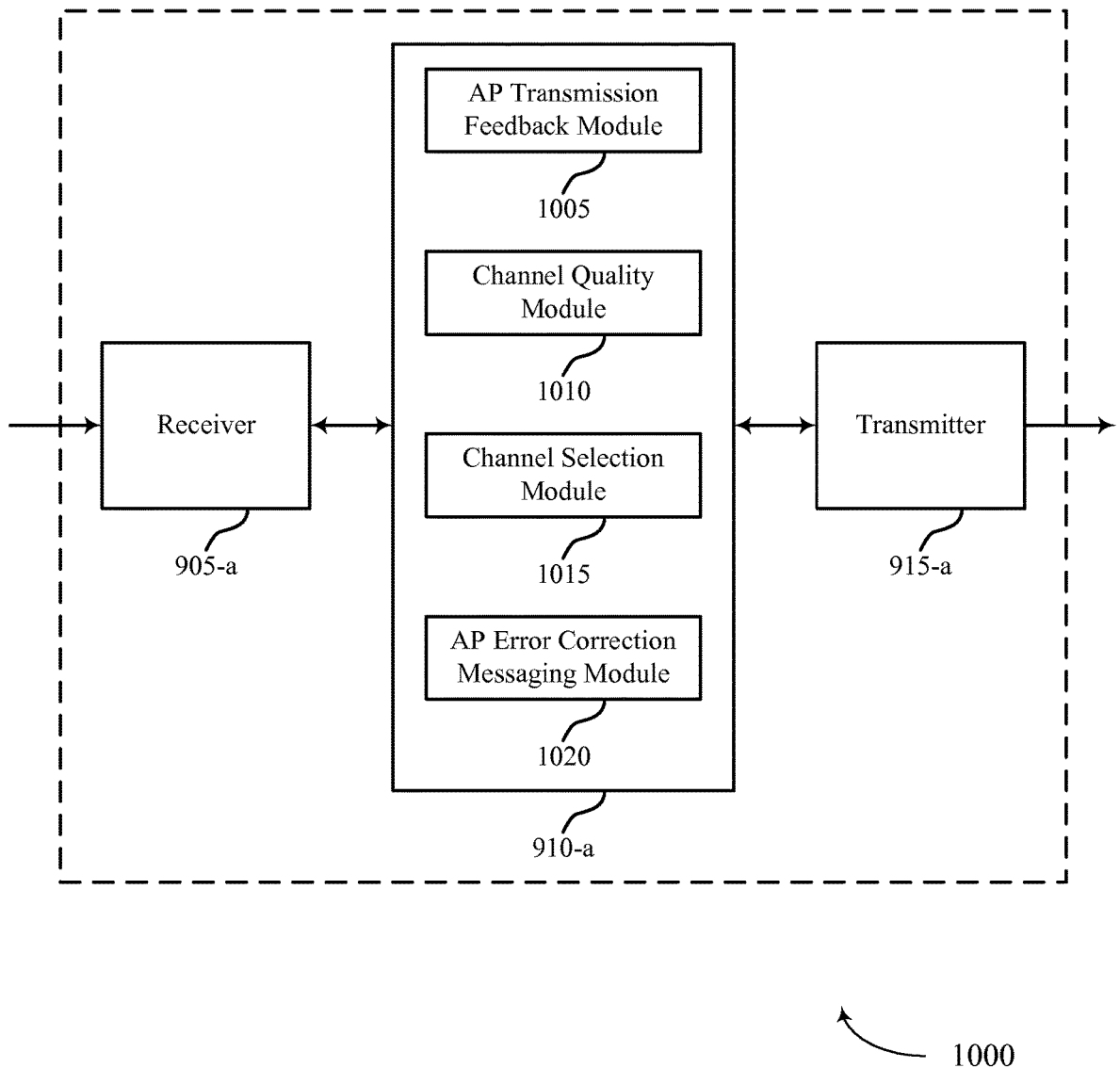

FIG. 10 shows a block diagram of a wireless device 1000 for reliable channel assisted HARQ in accordance with various aspects of the present disclosure. Wireless device 1000 may be an example of aspects of a wireless device 900 or an AP 105 described with reference to FIGS. 1-9. Wireless device 1000 may include a receiver 905-a, an AP transmission error correction module 910-a, or a transmitter 915-a. Wireless device 1000 may also include a processor. Each of these components may be in communication with each other. The AP transmission error correction module 910-a may also include an AP transmission feedback module 1005, a channel quality module 1010, a channel selection module 1015, and an AP error correction messaging module 1020.

The receiver 905-a may receive information which may be passed on to AP transmission error correction module 910-a and to other components of wireless device 1000. The AP transmission error correction module 910-a may perform the operations described with reference to FIG. 9. The transmitter 915-a may transmit signals received from other components of wireless device 1000.

The AP transmission feedback module 1005 may receive feedback identifying that a packet was unsuccessfully decoded by the receiving device as described with reference to FIGS. 2-4. In some cases, the feedback may be in the form of a NACK message and may contain a signal-to-noise ratio of the first channel.

The channel quality module 1010 may determine a level of degradation of the first channel as described with reference to FIGS. 2-4. The channel quality module 1010 may also determine a level of degradation of the first channel based on the received signal-to-noise ratio. In some cases, the channel quality module 1010 may determine a first channel quality indicator for the first channel, where the first level of reliability of the first channel is based on the first channel quality indicator. The channel quality module 1010 may also determine a second channel quality indicator for the second channel, where the second level of reliability of the second channel is based on the second channel quality indicator.

The channel selection module 1015 may select between the first channel or the second channel to send a transmission in response to the feedback indicating that a packed failed to decode. In some cases, the first channel may be in an unlicensed radio frequency spectrum band and the second channel may be in a licensed radio frequency spectrum band. In some examples, the second channel may be associated with a second level of reliability that is greater than the first level of reliability of the first channel. Channel selection module 1015 may select the channel based on the level of degradation of the first channel, as described with reference to FIGS. 2-4.

The AP error correction messaging module 1020 may transmit to the receiving device on the selected channel. In some cases, the transmission is based on the identified packet that failed to decode as described with reference to FIGS. 2-4.

Figure 11:
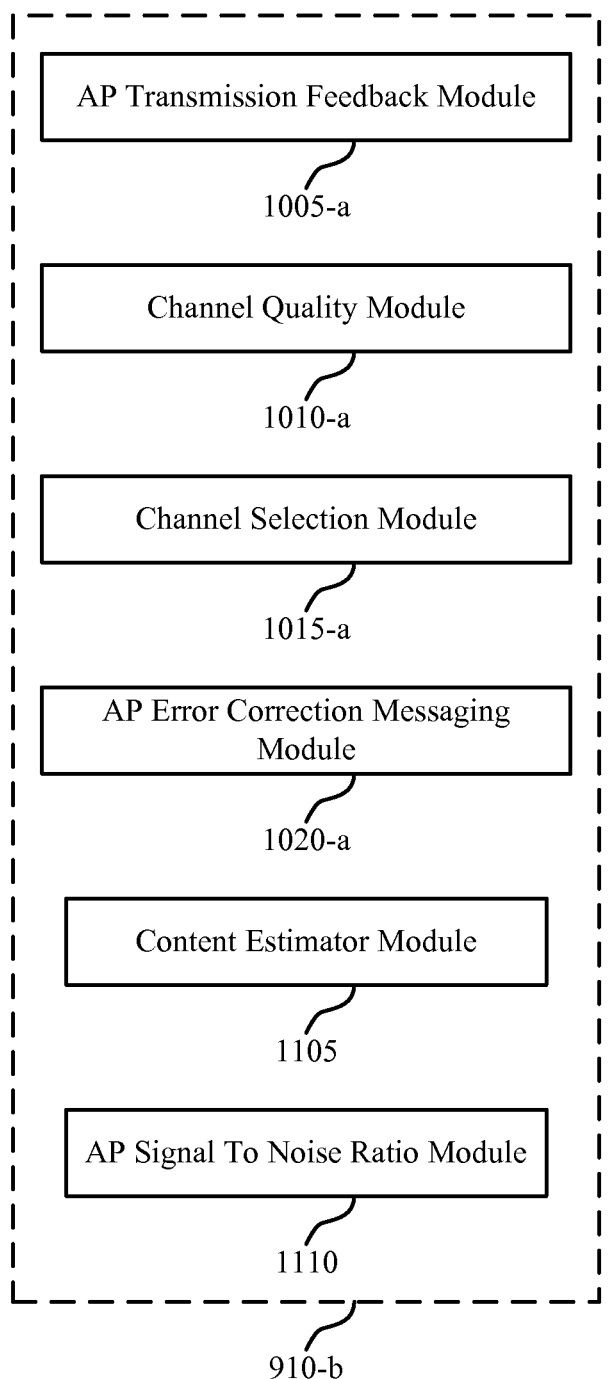

FIG. 11 shows a block diagram 1100 of an AP transmission error correction module 910-b which may be a component of a wireless device 900 or a wireless device 1000 for reliable channel assisted HARQ in accordance with various aspects of the present disclosure. The AP transmission error correction module 910-b may be an example of aspects of an AP transmission error correction module 910 described with reference to FIGS. 9-10. The AP transmission error correction module 910-b may include an AP transmission feedback module 1005-a, a channel quality module 1010-a, a channel selection module 1015-a, and an AP error correction messaging module 1020-a. Each of these modules may perform the functions described with reference to FIG. 10. The AP transmission error correction module 910-b may also include a content estimator module 1105 and an AP signal-to-noise ratio module 1110.

The content estimator module 1105 may determine an amount of extended parity bits associated with the identified packet that failed to decode to transmit based on the identified level of degradation of the first channel as described with reference to FIGS. 2-4. The AP signal-to-noise ratio module 1110 may receive a signal-to-noise ratio of the first channel as described with reference to FIGS. 2-4.

Figure 12:
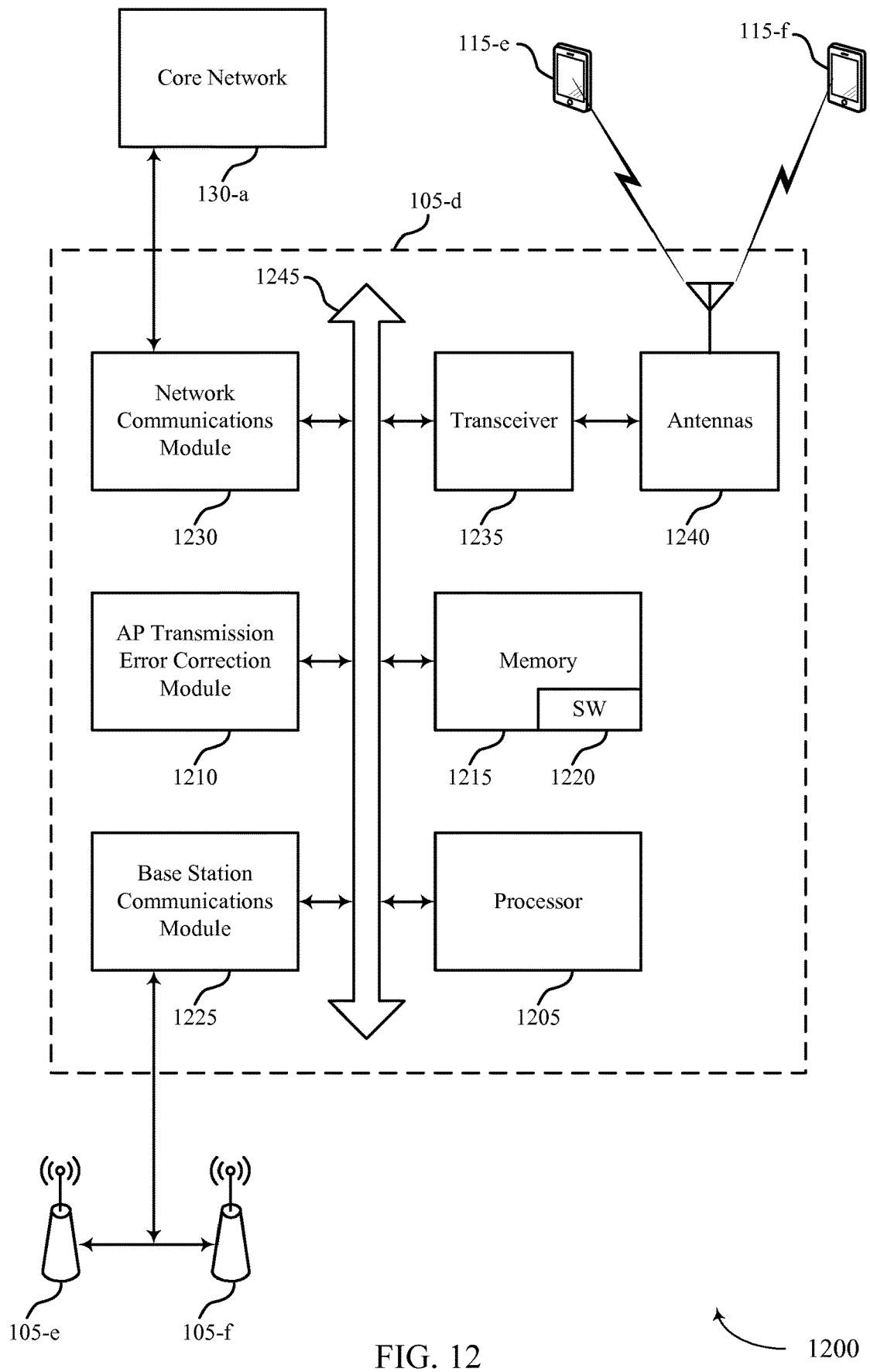
FIG. 12 illustrates a block diagram of a system including an AP that supports reliable channel assisted HARQ in accordance with various aspects of the present disclosure.

FIG. 12 shows a diagram of a system 1200 including an AP 105 configured for reliable channel assisted HARQ in accordance with various aspects of the present disclosure. System 1200 may include AP 105-d, which may be an example of a wireless device 900, a wireless device 1000, or an AP 105 described with reference to FIGS. 1, 2, 4 and 9-11. AP 105-d may include an AP transmission error correction module 1210, which may be an example of an AP transmission error correction module 910 described with reference to FIGS. 9-11. AP 105-d may also include components for bi-directional voice and data communications including components for transmitting communications and components for receiving communications. For example, AP 105-d may communicate bi-directionally with STA 115-e or STA 115-f.

In some cases, AP 105-d may have one or more wired backhaul links. For example, AP 105-d may have a wired backhaul link to a core network. AP 105-d may also communicate with other APs or APs 105, such as AP 105-e and AP 105-f via backhaul links. Each of the APs 105 may communicate with STAs 115 using the same or different wireless communications technologies. In some cases, AP 105-d may communicate with other APs such as AP 105-e or AP 105-f utilizing AP communications module 1225. In some examples, AP communications module 1225 may provide an X2 interface within a Long Term Evolution (LTE)/LTE-A wireless communication network technology to provide communication between some of the APs 105. In some cases, AP 105-d may communicate with the core network through network communications module 1230.

The AP 105-d may include a processor 1205, memory 1215 (including software (SW) 1220), transceiver 1235, and antenna(s) 1240, which each may be in communication, directly or indirectly, with one another (e.g., over bus system 1245). The transceiver 1235 may be configured to communicate bi-directionally, via the antenna(s) 1240, with the STAs 115, which may be multi-mode devices. The transceiver 1235 (or other components of the AP 105-d) may also be configured to communicate bi-directionally, via the antennas 1240, with one or more other APs (not shown). The transceiver 1235 may include a modem configured to modulate the packets and provide the modulated packets to the antennas 1240 for transmission, and to demodulate packets received from the antennas 1240. The AP 105-d may include multiple transceivers 1235, each with one or more associated antennas 1240. The transceiver may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor 1205 to perform various functions described herein (e.g., reliable channel assisted HARQ, determining channel quality, selecting channels for transmission, etc.). Alternatively, the software 1220 may not be directly executable by the processor 1205 but be configured to cause the computer, e.g., when compiled and executed, to perform functions described herein. The processor 1205 may include an intelligent hardware device, e.g., a CPU, a microcontroller, an ASIC, etc. The processor 1205 may include various special purpose processors such as encoders, queue processing modules, base band processors, radio head controllers, digital signal processor (DSPs), and the like.

The AP communications module 1225 may manage communications with other APs 105. In some cases, a communications management module may include a controller or scheduler for controlling communications with STAs 115 in cooperation with other APs 105. For example, the AP communications module 1225 may coordinate scheduling for transmissions to STAs 115 for various interference mitigation techniques such as beamforming or joint transmission.

The components of wireless device 500, wireless device 600, and transmission error correction module 510, system 800, wireless device 900, and AP transmission error correction module 910, may, individually or collectively, be implemented with at least one ASIC adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 13:
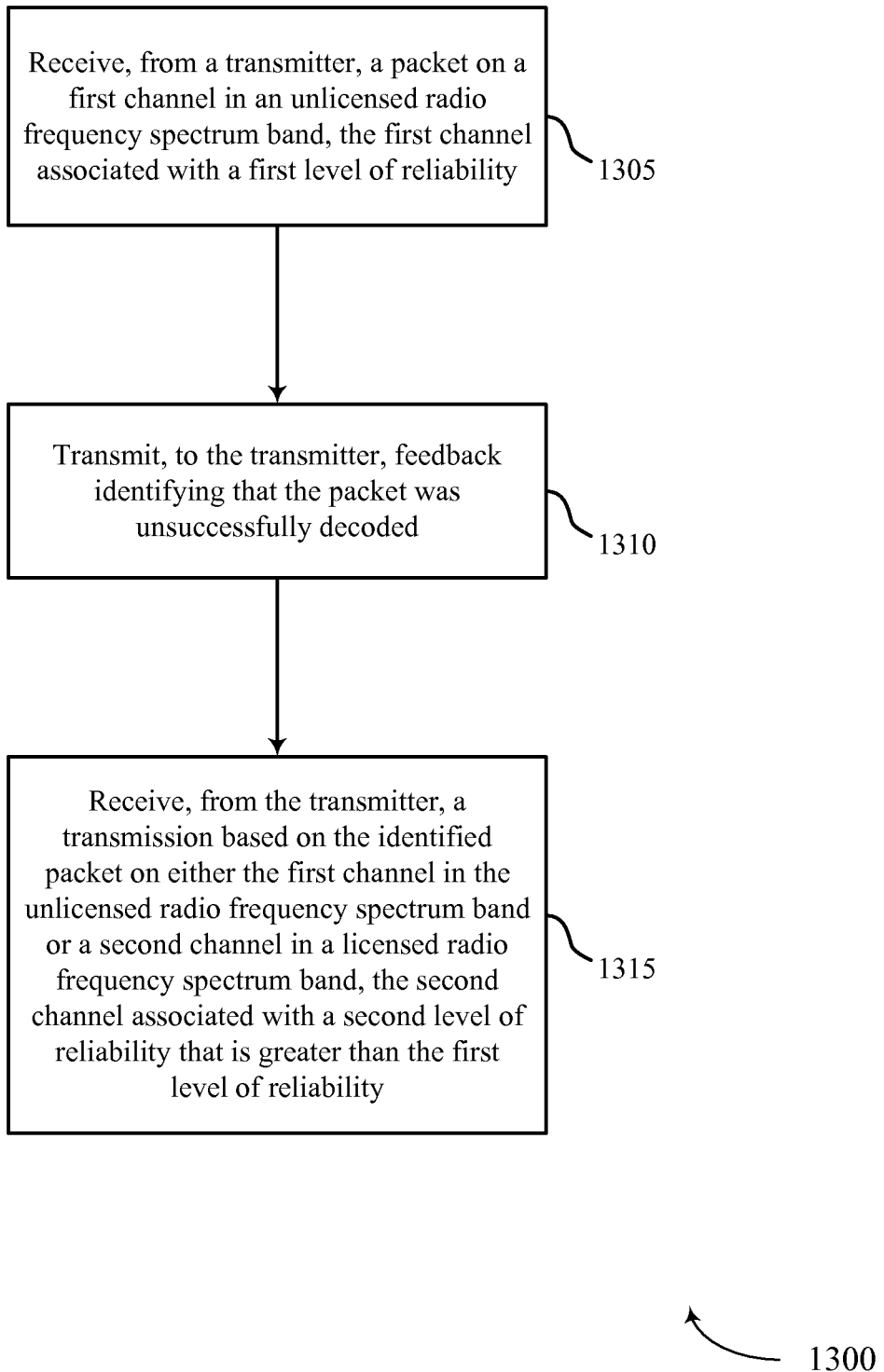
FIGS. 13-17 illustrate methods for reliable channel assisted HARQ in accordance with various aspects of the present disclosure.

FIG. 13 shows a flowchart illustrating a method 1300 for reliable channel assisted HARQ in accordance with various aspects of the present disclosure. The operations of method 1300 may be implemented by a STA 115 or its components as described with reference to FIGS. 1-12. For example, the operations of method 1300 may be performed by the transmission error correction module 510 as described with reference to FIGS. 5-8. In some examples, a STA 115 may execute a set of codes to control the functional elements of the STA 115 to perform the functions described below. Additionally or alternatively, the STA 115 may perform aspects the functions described below using special-purpose hardware.

At block 1305, the STA 115 may receive, from a transmitter, a packet on a first channel in an unlicensed radio frequency spectrum band, the first channel associated with a first level of reliability as described with reference to FIGS. 2-4. In certain examples, the operations of block 1305 may be performed by the receiver 505 as described with reference to FIG. 5.

At block 1310, the STA 115 may transmit, to the transmitter, feedback identifying that the packet was unsuccessfully decoded as described with reference to FIGS. 2-4. In certain examples, the operations of block 1310 may be performed by the transmission feedback module 605 as described with reference to FIG. 6.

At block 1315, the STA 115 may receive, from the transmitter, a transmission based at least in part on the identified packet on either the first channel in the unlicensed radio frequency spectrum band or a second channel in a licensed radio frequency spectrum band, the second channel associated with a second level of reliability that is greater than the first level of reliability as described with reference to FIGS. 2-4. In certain examples, the operations of block 1315 may be performed by the error correction messaging module 610 as described with reference to FIG. 6.

Figure 14:
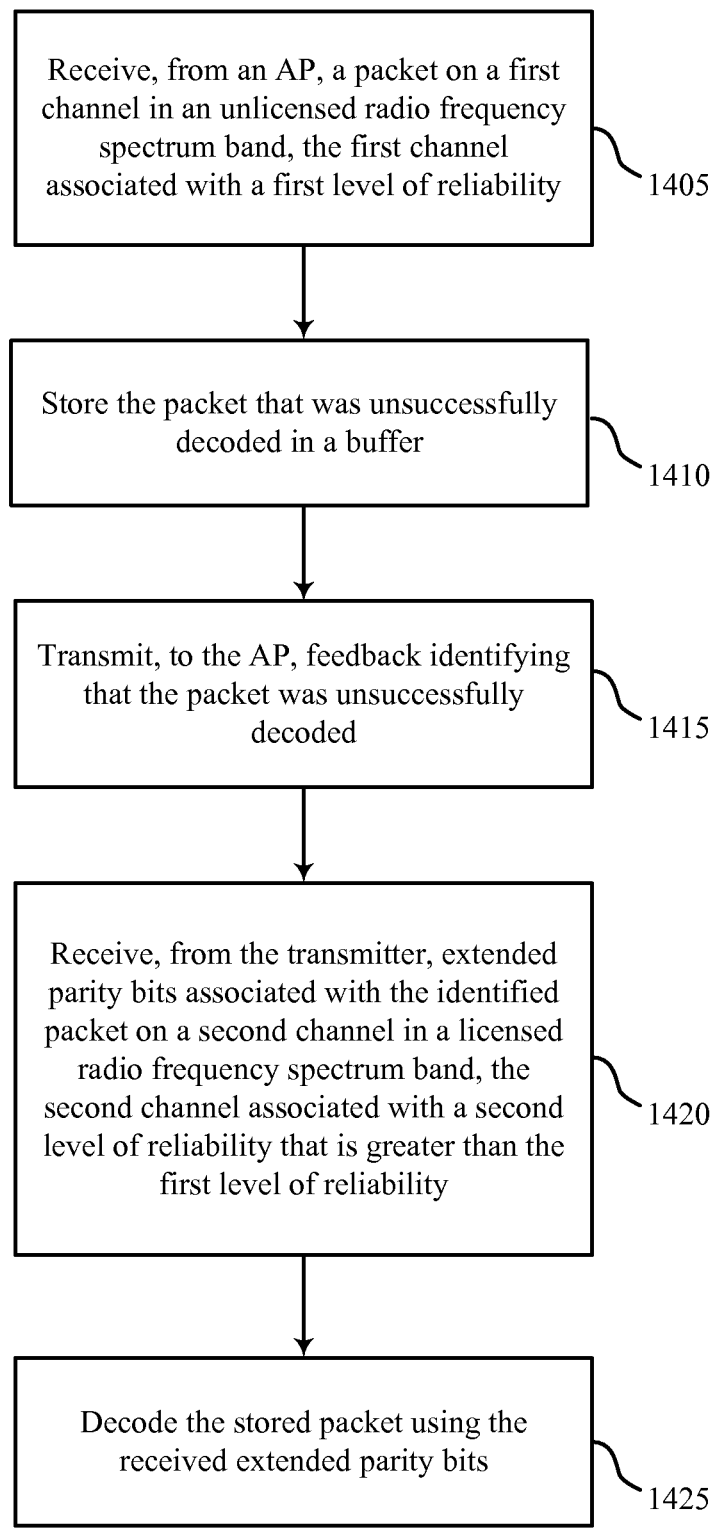

FIG. 14 shows a flowchart illustrating a method 1400 for reliable channel assisted HARQ in accordance with various aspects of the present disclosure. The operations of method 1400 may be implemented by a STA 115 or its components as described with reference to FIGS. 1-12. For example, the operations of method 1400 may be performed by the transmission error correction module 510 as described with reference to FIGS. 5-8. In some examples, a STA 115 may execute a set of codes to control the functional elements of the STA 115 to perform the functions described below. Additionally or alternatively, the STA 115 may perform aspects the functions described below using special-purpose hardware. The method 1400 may also incorporate aspects of method 1300 of FIG. 13.

At block 1405, the STA 115 may receive, from an AP, a packet on a first channel in an unlicensed radio frequency spectrum band, the first channel associated with a first level of reliability as described with reference to FIGS. 2-4. In certain examples, the operations of block 1405 may be performed by the receiver 505 as described with reference to FIG. 5.

At block 1410, the STA 115 may store the packet that was unsuccessfully decoded in a buffer as described with reference to FIGS. 2-4. In certain examples, the operations of block 1410 may be performed by the packet buffering module 705 as described with reference to FIG. 7.

At block 1415, the STA 115 may transmit, to the AP, feedback identifying that the packet was unsuccessfully decoded as described with reference to FIGS. 2-4. In certain examples, the operations of block 1415 may be performed by the transmission feedback module 605 as described with reference to FIG. 6.

At block 1420, the STA 115 may receive, from the transmitter, extended parity bits associated with the identified packet on a second channel in a licensed radio frequency spectrum band, the second channel associated with a second level of reliability that is greater than the first level of reliability as described with reference to FIGS. 2-4. In certain examples, the operations of block 1420 may be performed by the error correction messaging module 610 as described with reference to FIG. 6.

At block 1425, the STA 115 may decode the stored packet using the received extended parity bits as described with reference to FIGS. 2-4. In certain examples, the operations of block 1425 may be performed by the packet decoding module 710 as described with reference to FIG. 7.

Figure 15:
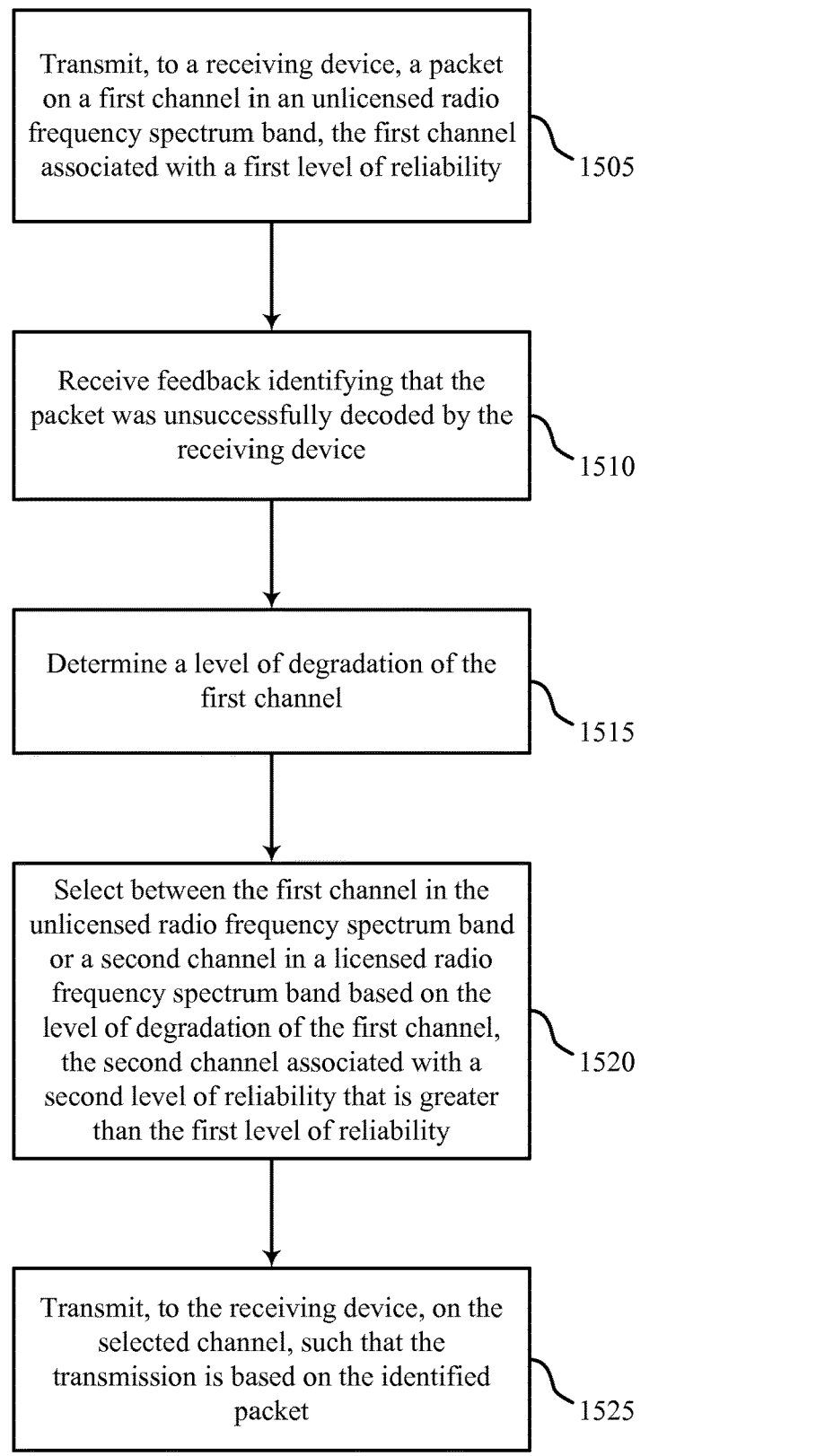

FIG. 15 shows a flowchart illustrating a method 1500 for reliable channel assisted HARQ in accordance with various aspects of the present disclosure. The operations of method 1500 may be implemented by an AP 105 or its components as described with reference to FIGS. 1-12. For example, the operations of method 1500 may be performed by the AP transmission error correction module 910 as described with reference to FIGS. 9-12. In some examples, an AP 105 may execute a set of codes to control the functional elements of the AP 105 to perform the functions described below. Additionally or alternatively, the AP 105 may perform aspects the functions described below using special-purpose hardware. The method 1500 may also incorporate aspects of methods 1300 and 1400 of FIGS. 13-14.

At block 1505, the AP 105 may transmit, to a receiving device, a packet on a first channel in an unlicensed radio frequency spectrum band, the first channel associated with a first level of reliability as described with reference to FIGS. 2-4. In certain examples, the operations of block 1505 may be performed by the transmitter 915 as described with reference to FIG. 9.

At block 1510, the AP 105 may receive feedback identifying that the packet was unsuccessfully decoded by the receiving device as described with reference to FIGS. 2-4. In certain examples, the operations of block 1510 may be performed by the AP transmission feedback module 1005 as described with reference to FIG. 10.

At block 1515, the AP 105 may determine a level of degradation of the first channel as described with reference to FIGS. 2-4. In certain examples, the operations of block 1515 may be performed by the channel quality module 1010 as described with reference to FIG. 10.

At block 1520, the AP 105 may select between the first channel in the unlicensed radio frequency spectrum band or a second channel in a licensed radio frequency spectrum band based at least in part on the level of degradation of the first channel, the second channel associated with a second level of reliability that is greater than the first level of reliability as described with reference to FIGS. 2-4. In certain examples, the operations of block 1520 may be performed by the channel selection module 1015 as described with reference to FIG. 10.

At block 1525, the AP 105 may transmit, to the receiving device, on the selected channel, wherein the transmission is based at least in part on the identified packet as described with reference to FIGS. 2-4. In certain examples, the operations of block 1525 may be performed by the AP error correction messaging module 1020 as described with reference to FIG. 10.

Figure 16:
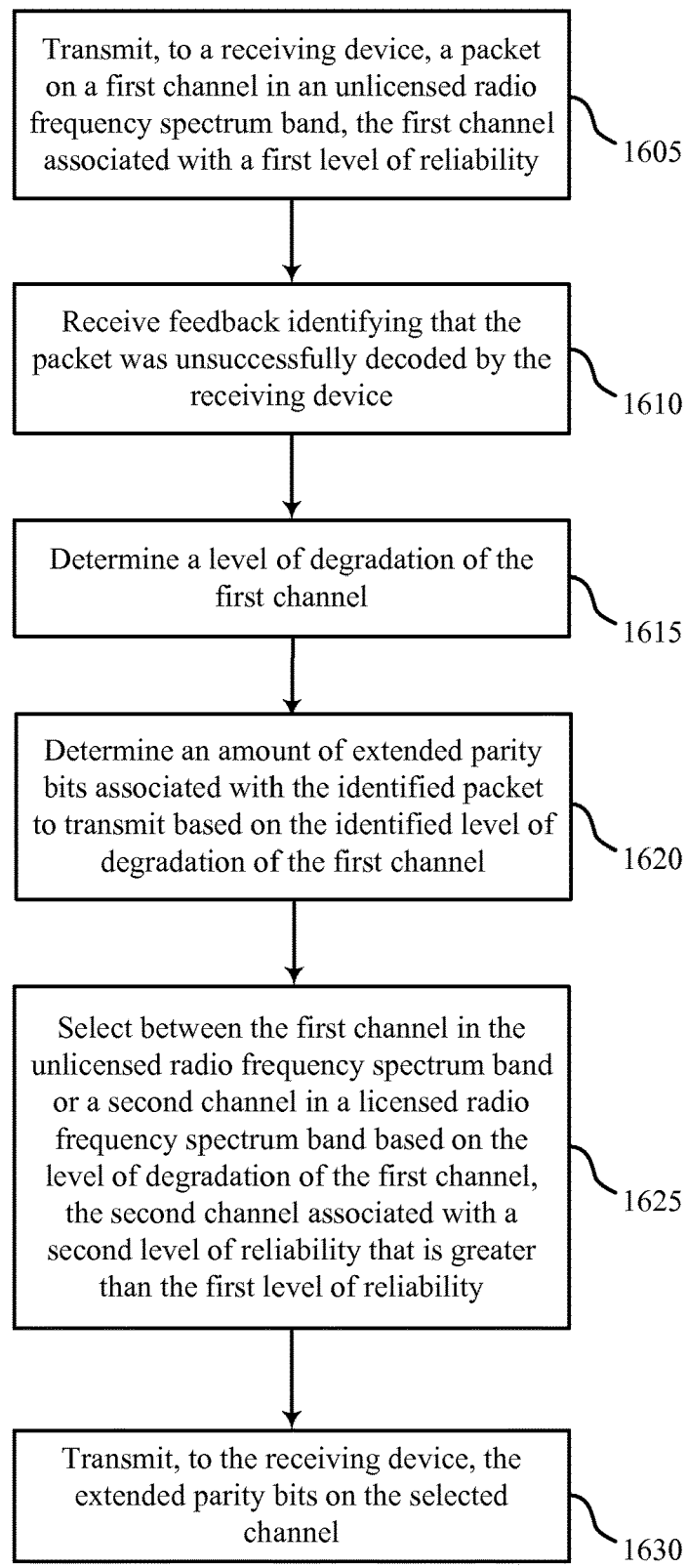

FIG. 16 shows a flowchart illustrating a method 1600 for reliable channel assisted HARQ in accordance with various aspects of the present disclosure. The operations of method 1600 may be implemented by an AP 105 or its components as described with reference to FIGS. 1-12. For example, the operations of method 1600 may be performed by the AP transmission error correction module 910 as described with reference to FIGS. 9-12. In some examples, an AP 105 may execute a set of codes to control the functional elements of the AP 105 to perform the functions described below. Additionally or alternatively, the AP 105 may perform aspects of the functions described below using special-purpose hardware. The method 1600 may also incorporate aspects of methods 1300, 1400, and 1500 of FIGS. 13-15.

At block 1605, the AP 105 may transmit, to a receiving device, a packet on a first channel in an unlicensed radio frequency spectrum band, the first channel associated with a first level of reliability as described with reference to FIGS. 2-4. In certain examples, the operations of block 1605 may be performed by the transmitter 915 as described with reference to FIG. 9.

At block 1610, the AP 105 may receive feedback identifying that the packet was unsuccessfully decoded by the receiving device as described with reference to FIGS. 2-4. In certain examples, the operations of block 1610 may be performed by the AP transmission feedback module 1005 as described with reference to FIG. 10.

At block 1615, the AP 105 may determine a level of degradation of the first channel as described with reference to FIGS. 2-4. In certain examples, the operations of block 1615 may be performed by the channel quality module 1010 as described with reference to FIG. 10.

At block 1620, the AP 105 may determine an amount of extended parity bits associated with the identified packet to transmit based at least in part on the identified level of degradation of the first channel as described with reference to FIGS. 2-4. In certain examples, the operations of block 1620 may be performed by the content estimator module 1105 as described with reference to FIG. 11.

At block 1625, the AP 105 may select between the first channel in the unlicensed radio frequency spectrum band or a second channel in a licensed radio frequency spectrum band based at least in part on the level of degradation of the first channel, the second channel associated with a second level of reliability that is greater than the first level of reliability as described with reference to FIGS. 2-4. In certain examples, the operations of block 1625 may be performed by the channel selection module 1015 as described with reference to FIG. 10.

At block 1630, the AP 105 may transmit, to the receiving device, the extended parity bits on the selected channel, as described with reference to FIGS. 2-4. In certain examples, the operations of block 1630 may be performed by the AP error correction messaging module 1020 as described with reference to FIG. 10.

Figure 17:
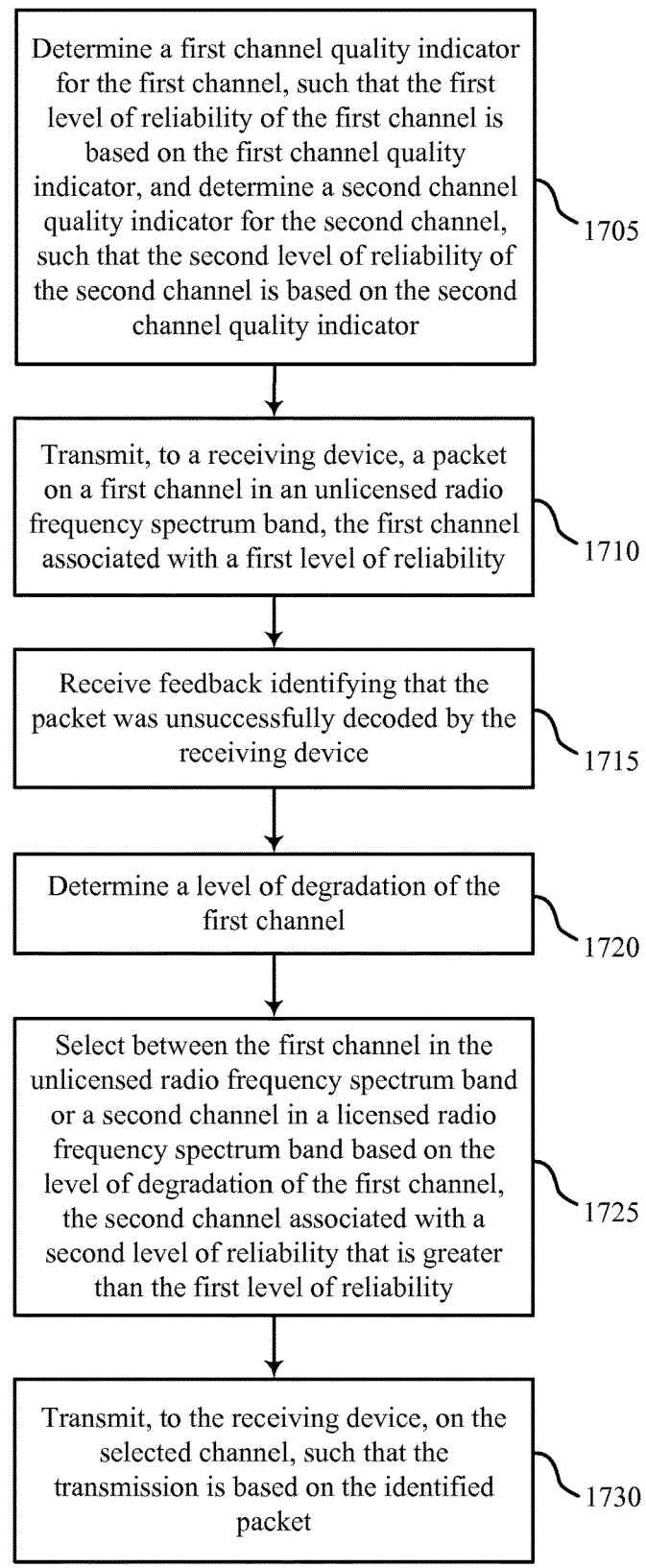

FIG. 17 shows a flowchart illustrating a method 1700 for reliable channel assisted HARQ in accordance with various aspects of the present disclosure. The operations of method 1700 may be implemented by an AP 105 or its components as described with reference to FIGS. 1-12. For example, the operations of method 1700 may be performed by the AP transmission error correction module 910 as described with reference to FIGS. 9-12. In some examples, an AP 105 may execute a set of codes to control the functional elements of the AP 105 to perform the functions described below. Additionally or alternatively, the AP 105 may perform aspects the functions described below using special-purpose hardware. The method 1700 may also incorporate aspects of methods 1300, 1400, 1500, and 1600 of FIGS. 13-16.

At block 1705, the AP 105 may determine a first channel quality indicator for the first channel, where the first level of reliability of the first channel is based on the first channel quality indicator as described with reference to FIGS. 2-4. Additionally, AP 105 may determine a second channel quality indicator for the second channel, where the second level of reliability of the second channel is based on the second channel quality indicator as described with reference to FIGS. 2-4. In certain examples, the operations of block 1705 may be performed by the channel quality module 1010 as described with reference to FIG. 10.

At block 1710, the AP 105 may transmit, to a receiving device, a packet on a first channel in an unlicensed radio frequency spectrum band, the first channel associated with a first level of reliability as described with reference to FIGS.

2-4. In certain examples, the operations of block 1710 may be performed by the transmitter 915 as described with reference to FIG. 9.

At block 1715, the AP 105 may receive feedback identifying that the packet was unsuccessfully decoded by the receiving device as described with reference to FIGS. 2-4. In certain examples, the operations of block 1715 may be performed by the AP transmission feedback module 1005 as described with reference to FIG. 10.

At block 1720, the AP 105 may determine a level of degradation of the first channel as described with reference to FIGS. 2-4. In certain examples, the operations of block 1720 may be performed by the channel quality module 1010 as described with reference to FIG. 10.

At block 1725, the AP 105 may select between the first channel in the unlicensed radio frequency spectrum band or a second channel in a licensed radio frequency spectrum band based at least in part on the level of degradation of the first channel, the second channel associated with a second level of reliability that is greater than the first level of reliability as described with reference to FIGS. 2-4. In certain examples, the operations of block 1725 may be performed by the channel selection module 1015 as described with reference to FIG. 10.

At block 1730, the AP 105 may transmit, to the receiving device, on the selected channel, wherein the transmission is based at least in part on the identified packet as described with reference to FIGS. 2-4. In certain examples, the operations of block 1730 may be performed by the AP error correction messaging module 1020 as described with reference to FIG. 10.

Thus, methods 1300, 1400, 1500, 1600, and 1700 may provide for reliable channel assisted HARQ. It should be noted that methods 1300, 1400, 1500, 1600, and 1700 describe possible implementations and that the operations and the steps may be rearranged or otherwise modified such that other implementations are possible. In some examples, aspects from two or more of the methods 1300, 1400, 1500, 1600, and 1700 may be combined.

The description herein provides examples and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one" of or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
receiving, from a transmitter, a packet on a first channel in an unlicensed radio frequency spectrum band, the first channel associated with a first level of reliability;
transmitting, to the transmitter, feedback identifying that the packet was unsuccessfully decoded; and
receiving, from the transmitter on either the first channel in the unlicensed radio frequency spectrum band or a second channel in a licensed radio frequency spectrum band, a transmission that comprises a set of parity bits associated with the packet, wherein an amount of parity bits in the set of parity bits is based at least in part on a level of degradation of the first channel, and wherein the second channel is associated with a second level of reliability that is greater than the first level of reliability, and wherein whether the transmission is received on either the first channel or the second channel is based at least in part on the amount of parity bits in the set of parity bits.

2. The method of claim 1, wherein the set of parity bits includes additional parity information for the packet relative to an initial amount of parity information included in the packet.

3. The method of claim 1, further comprising:
determining a signal-to-noise ratio of the first channel; and
transmitting the signal-to-noise ratio to the transmitter.

4. The method of claim 1, wherein the transmission on either the first channel or the second channel lacks systematic bits.

5. The method of claim 1, wherein whether the transmission is received on either the first channel or the second channel is further based at least in part on the first level of reliability associated with the first channel or the second level of reliability associated with the second channel.

6. A method of wireless communication, comprising:
transmitting, to a receiving device, a packet on a first channel in an unlicensed radio frequency spectrum band, the first channel associated with a first level of reliability;
receiving feedback identifying that the packet was unsuccessfully decoded by the receiving device;
determining a level of degradation of the first channel;
determining a set of parity bits associated with the packet to transmit, wherein an amount of parity bits in the set of parity bits is based at least in part on the level of degradation of the first channel;
selecting between the first channel in the unlicensed radio frequency spectrum band and a second channel in a licensed radio frequency spectrum band, wherein the selecting is based at least in part on the amount of parity bits in the set of parity bits, and wherein the second channel is associated with a second level of reliability that is greater than the first level of reliability; and
transmitting a transmission comprising the set of parity bits on the selected channel.

7. The method of claim 6, wherein the set of parity bits includes additional parity information for the packet relative to an initial amount of parity information included in the packet.

8. The method of claim 6, wherein the selecting is further based at least in part on the first level of reliability associated with the first channel or the second level of reliability associated with the second channel.

9. The method of claim 6, further comprising:
receiving a signal-to-noise ratio for the first channel, wherein determining the level of degradation of the first channel is based at least in part on the received signal-to-noise ratio.

10. The method of claim 6, further comprising:
determining a first channel quality indicator for the first channel, wherein the first level of reliability of the first channel is based at least in part on the first channel quality indicator.

11. The method of claim 6, further comprising:
determining a second channel quality indicator for the second channel, wherein the second level of reliability of the second channel is based at least in part on the second channel quality indicator.

12. The method of claim 6, wherein the feedback identifying that the packet was unsuccessfully decoded comprises a negative acknowledgment (NACK) message.

13. The method of claim 6, wherein the transmission comprising the set of parity bits lacks systematic bits.

14. An apparatus for wireless communication, comprising:
a processor;
memory in electronic communication with the processor; and
instructions stored in the memory and operable, when executed by the processor, to cause the apparatus to:
receive, from a transmitter, a packet on a first channel in an unlicensed radio frequency spectrum band, the first channel associated with a first level of reliability;
transmit, to the transmitter, feedback identifying that the packet was unsuccessfully decoded; and
receive, from the transmitter on either the first channel in the unlicensed radio frequency spectrum band or a second channel in a licensed radio frequency spectrum band, a transmission that comprises a set of parity bits associated with the packet, wherein an amount of parity bits in the set of parity bits is based at least in part on a level of degradation of the first channel, and wherein the second channel is associated with a second level of reliability that is greater than the first level of reliability, and wherein whether the transmission is received on either the first channel or the second channel is based at least in part on the amount of parity bits in the set of parity bits.

15. The apparatus of claim 14, wherein the set of parity bits includes additional parity information for the packet relative to an initial amount of parity information included in the packet.

16. The apparatus of claim 14, wherein the instructions are operable to cause the apparatus to:
determine a signal-to-noise ratio of the first channel; and
transmit the signal-to-noise ratio to the transmitter.

17. The apparatus of claim 14, wherein the transmission on either the first channel or the second channel lacks systematic bits.

18. The apparatus of claim 14, wherein whether the transmission is received on either the first channel or the second channel is further based at least in part on the first level of reliability associated with the first channel or the second level of reliability associated with the second channel.

19. An apparatus for wireless communication, comprising:
a processor;
memory in electronic communication with the processor; and
instructions stored in the memory and operable, when executed by the processor, to cause the apparatus to:
transmit, to a receiving device, a packet on a first channel in an unlicensed radio frequency spectrum band, the first channel associated with a first level of reliability;
receive feedback identifying that the packet was unsuccessfully decoded by the receiving device;
determine a level of degradation of the first channel;
determine a set of parity bits associated with the packet to transmit, wherein an amount of parity bits in the set of parity bits is based at least in part on the level of degradation of the first channel;
select between the first channel in the unlicensed radio frequency spectrum band and a second channel in a licensed radio frequency spectrum band, wherein the selecting is based at least in part on the amount of parity bits in the set of parity bits, and wherein the second channel is associated with a second level of reliability that is greater than the first level of reliability; and
transmit a transmission comprising the set of parity bits on the selected channel.

20. The apparatus of claim 19, wherein the set of parity bits includes additional parity information for the packet relative to an initial amount of parity information included in the packet.

21. The apparatus of claim 19, wherein the selecting is further based at least in part on the first level of reliability associated with the first channel or the second level of reliability associated with the second channel.

22. The apparatus of claim 19, wherein the instructions are operable to cause the apparatus to:
receive a signal-to-noise ratio of the first channel, wherein the instructions are operable to cause the apparatus to determine the level of degradation of the first channel based at least in part on the received signal-to-noise ratio.

23. The apparatus of claim 19, wherein the instructions are operable to cause the apparatus to:
determine a first channel quality indicator for the first channel, wherein the first level of reliability of the first channel is based at least in part on the first channel quality indicator.

24. The apparatus of claim 19, wherein the instructions are operable to cause the apparatus to:
determine a second channel quality indicator for the second channel, wherein the second level of reliability of the second channel is based at least in part on the second channel quality indicator.

25. The apparatus of claim 19, wherein the feedback identifying that the packet was unsuccessfully decoded comprises a negative acknowledgment (NACK) message.

26. The apparatus of claim 19, wherein the transmission comprising the set of parity bits lacks systematic bits.

* * * * *